United States Patent [19]
Nicholson et al.

[11] Patent Number: 5,797,415
[45] Date of Patent: Aug. 25, 1998

[54] INSULATING JACKET FOR HOT AND COLD PIPING SYSTEMS AND THE METHOD OF USE

[75] Inventors: R. Kent Nicholson, Phoenix; Norman Somerville, Columbia; James L. Beckstrom, Parkton, all of Md.

[73] Assignee: Horizon Resources Corp., Hunt Valley, Md.

[21] Appl. No.: 468,845

[22] Filed: Jun. 6, 1995

Related U.S. Application Data

[60] Division of Ser. No. 184,013, Jan. 21, 1994, abandoned, which is a continuation-in-part of Ser. No. 136,126, Oct. 15, 1993, abandoned.

[51] Int. Cl.⁶ ................................. F16L 7/00; F16L 9/14
[52] U.S. Cl. .................. 137/15; 137/375; 137/559; 138/47; 138/149
[58] Field of Search .................. 137/375, 559, 137/15; 138/149, 47

[56] References Cited

U.S. PATENT DOCUMENTS

| | | | |
|---|---|---|---|
| 2,078,606 | 4/1937 | Le Grund | 154/45 |
| 3,724,491 | 4/1973 | Knudsen et al. | 137/375 |
| 4,976,366 | 12/1990 | Russell | 137/375 |
| 5,025,836 | 6/1991 | Botsolas | 137/375 |
| 5,090,447 | 2/1992 | Lewis et al. | 137/559 |
| 5,158,114 | 10/1992 | Botsolas | 137/375 |
| 5,360,031 | 11/1994 | Treub et al. | 137/375 |

*Primary Examiner*—A. Michael Chambers
*Attorney, Agent, or Firm*—Albert W. Davis, Jr.; Marvin S. Towsend

[57] ABSTRACT

This patent describes an insulating jacket that is removable and reusable, for insulating a hot or cold fluid distribution system. The jacket is made of a plurality of sections which mate and seal together to effectively seal the valve off from the surrounding ambient atmosphere. Each of the jacket sections can be made of a clear thermoplastic material and the entire assembly is designed to employ the trapped air, between the inside wall of the jacket and the system element, as the insulator.

23 Claims, 19 Drawing Sheets

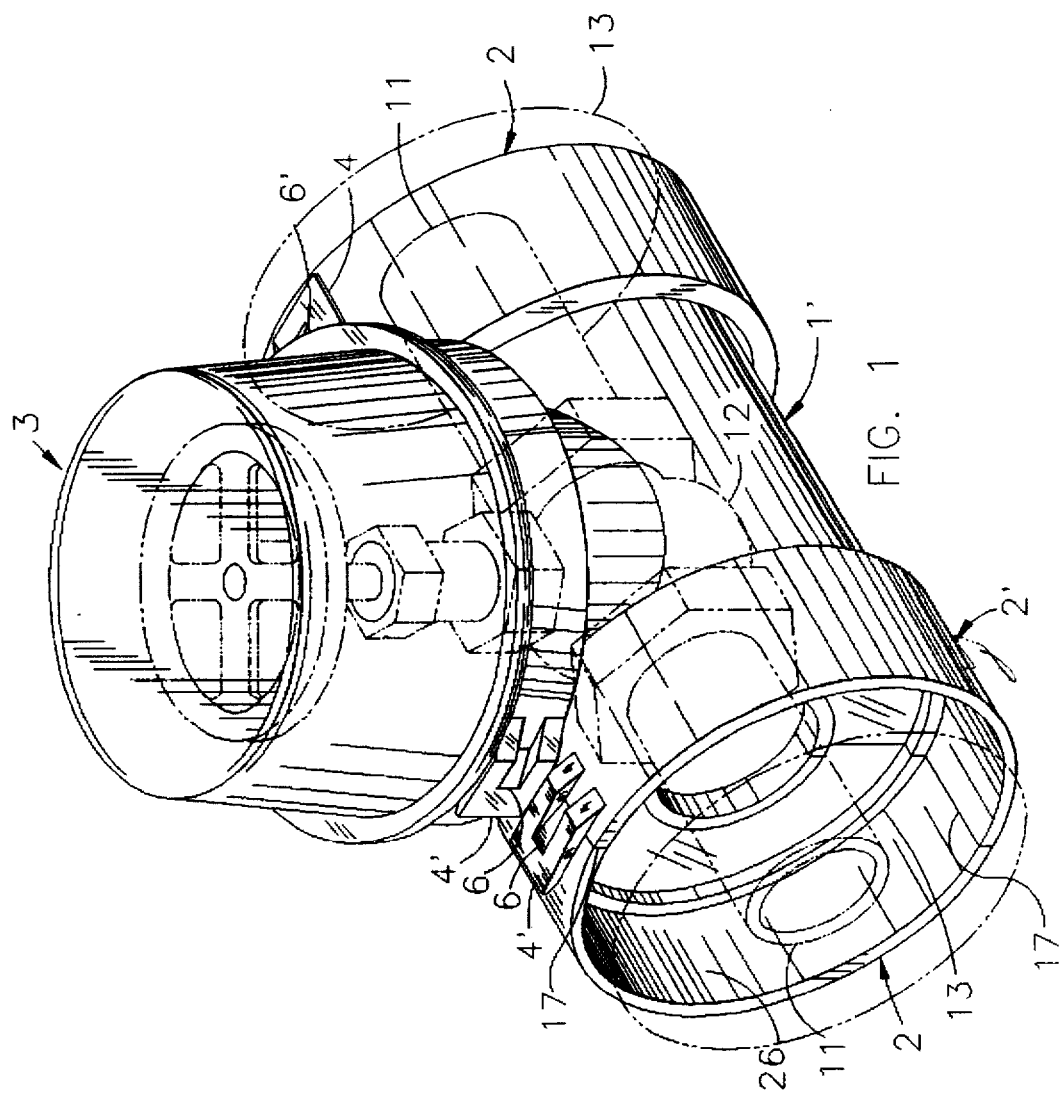

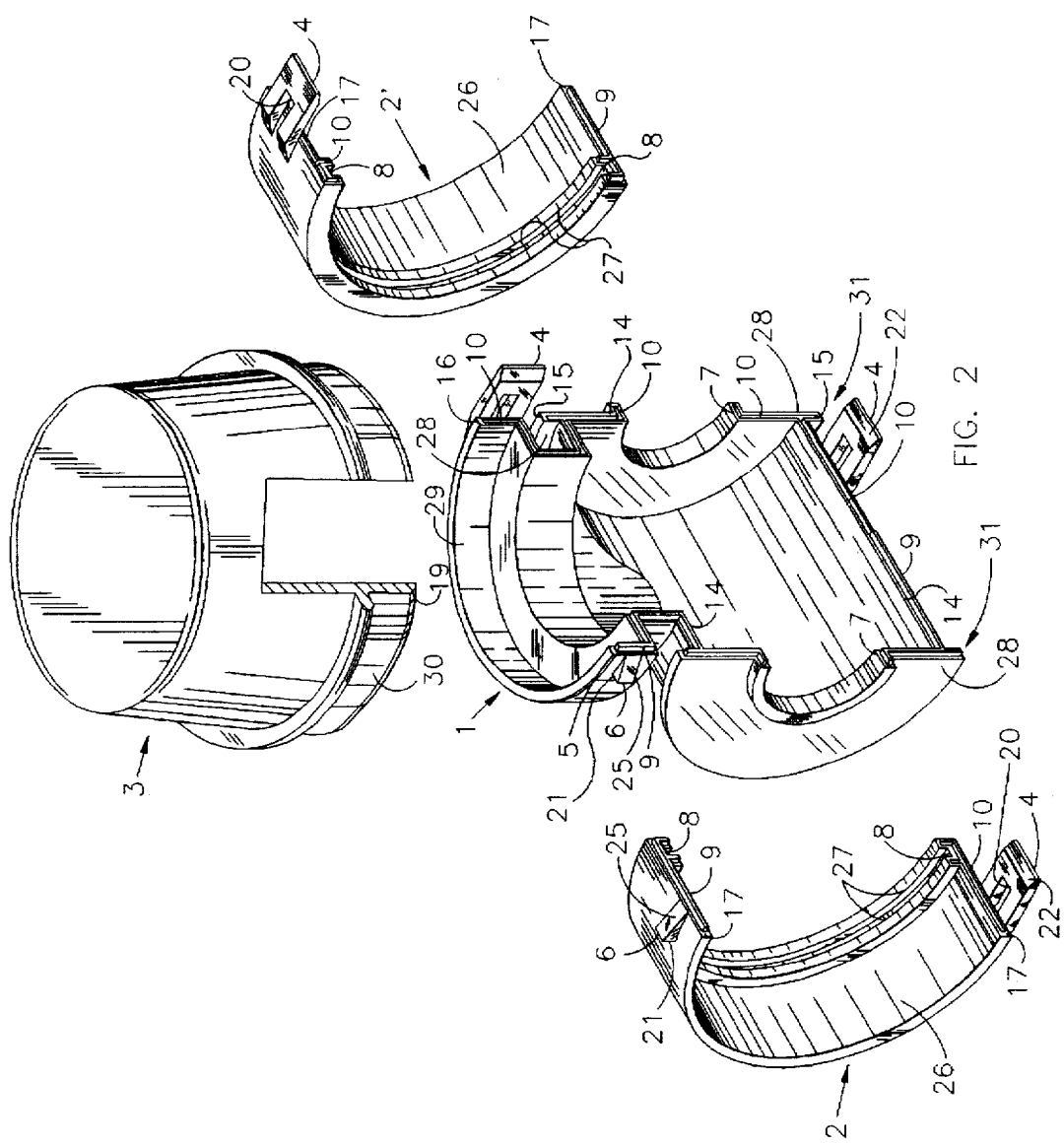

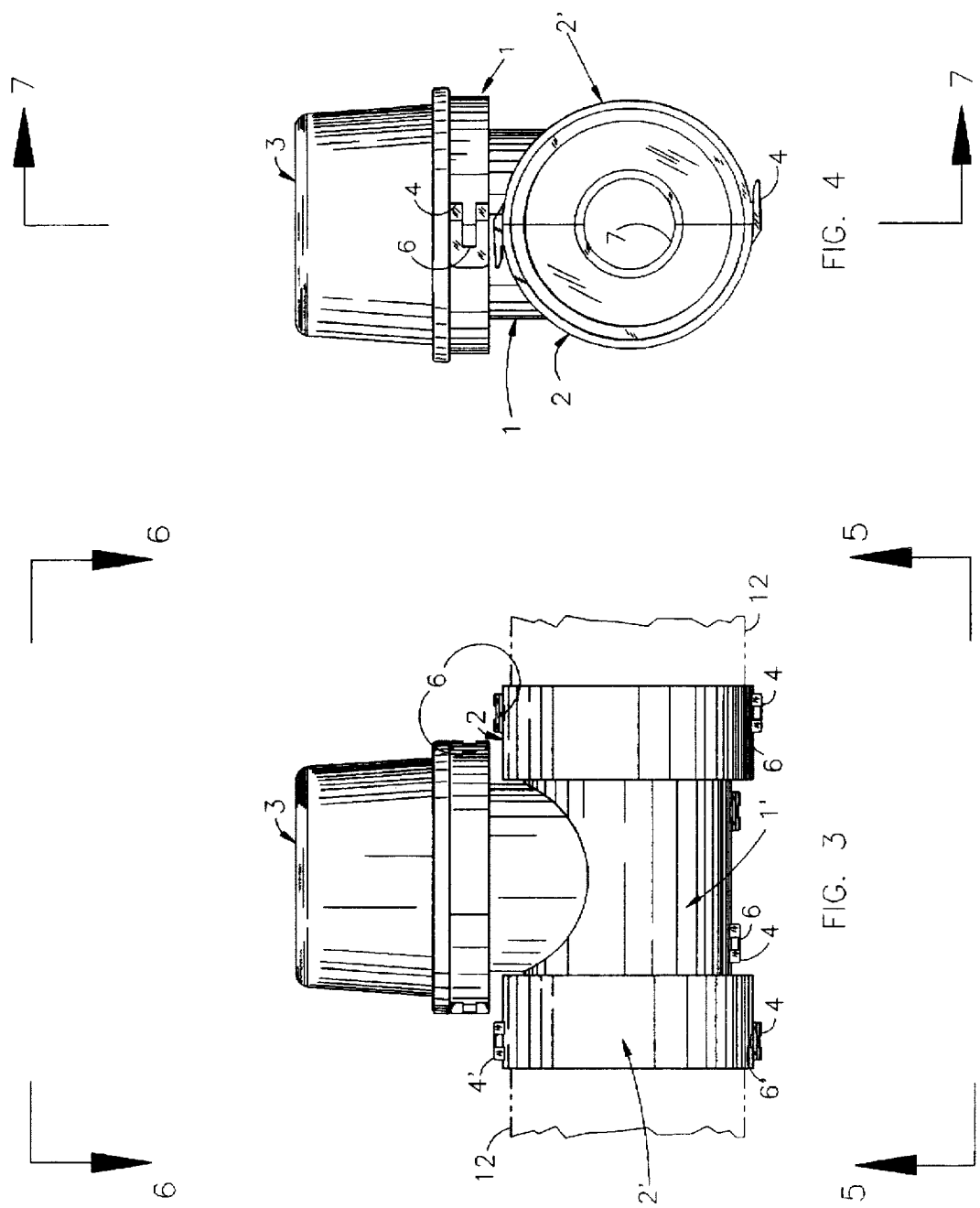

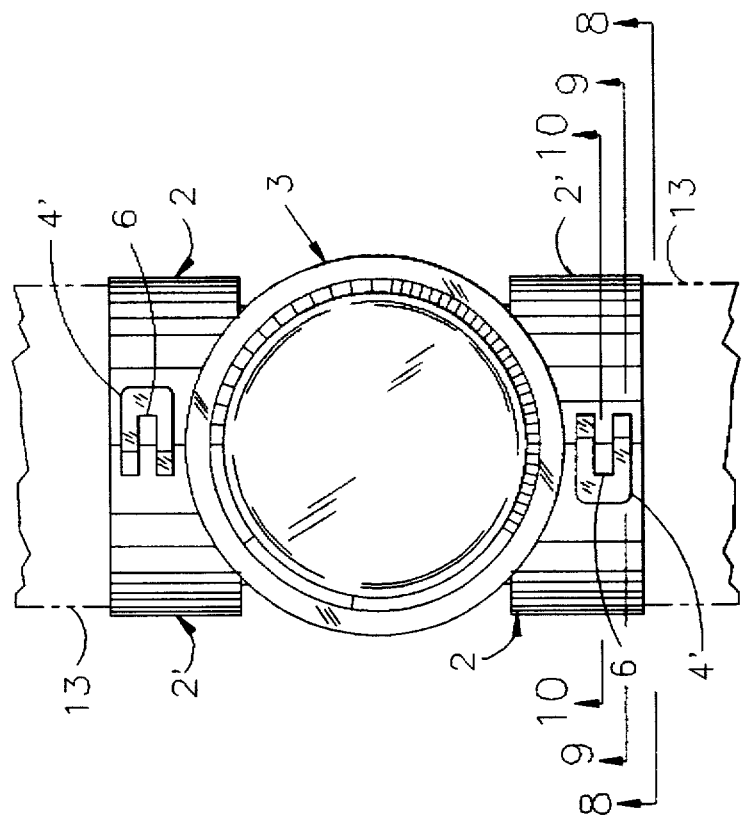
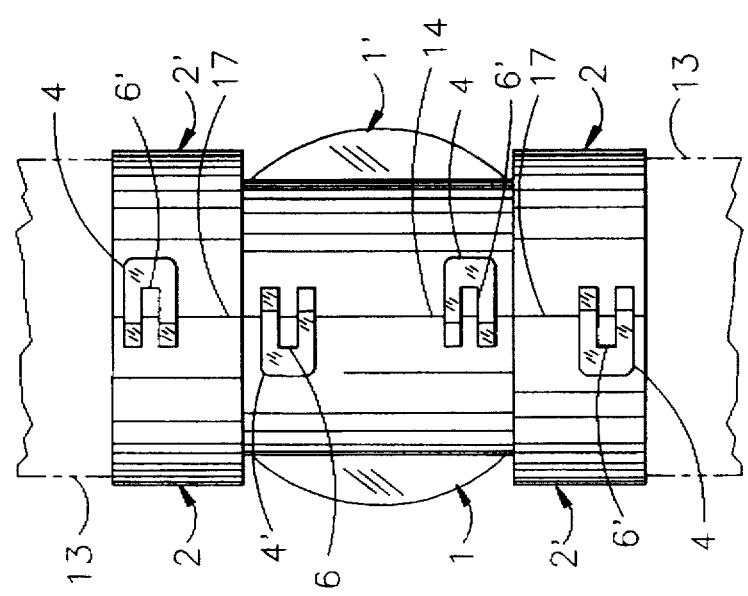

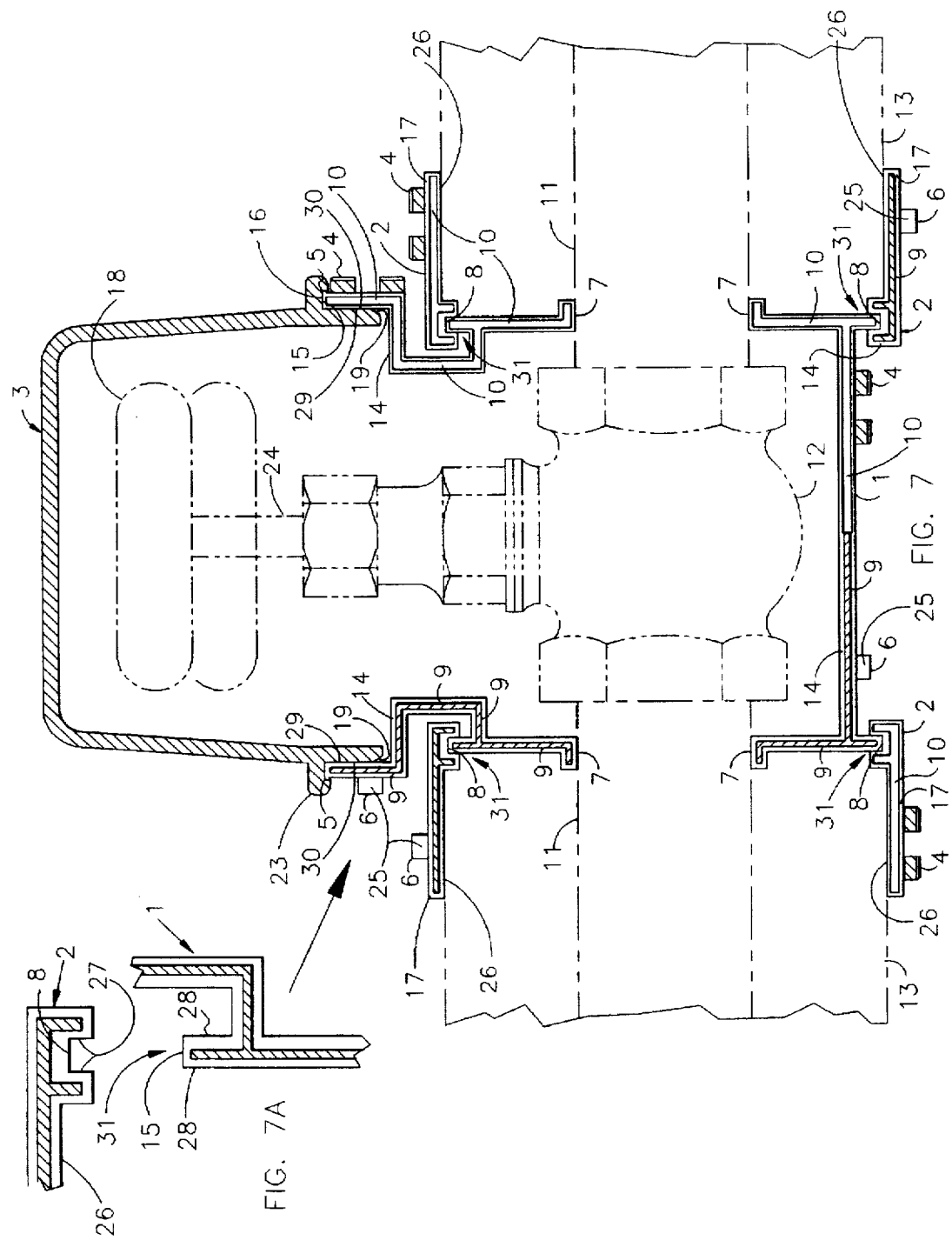

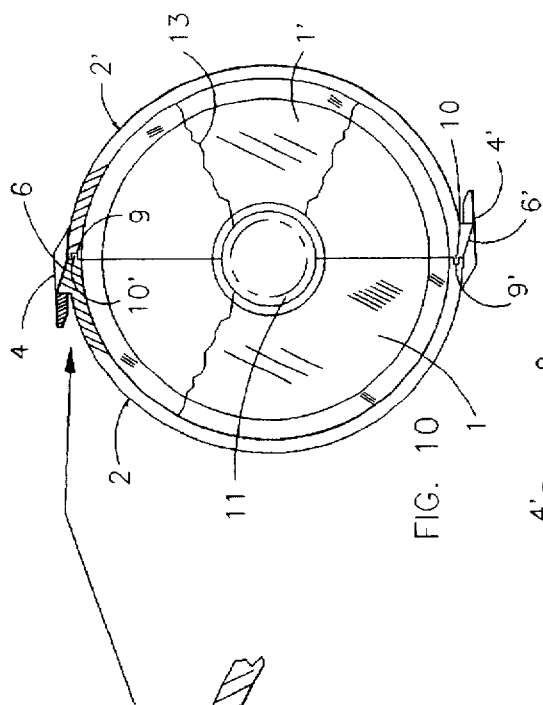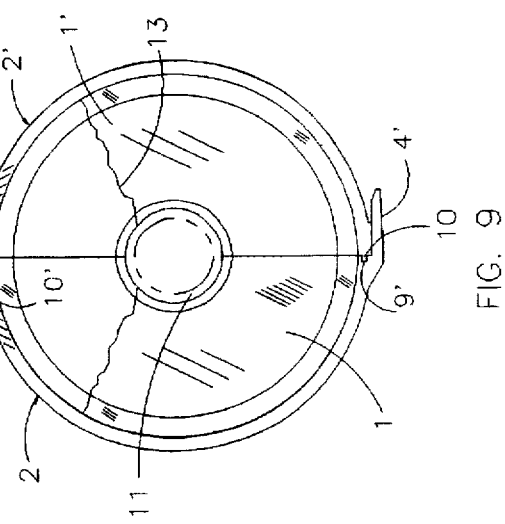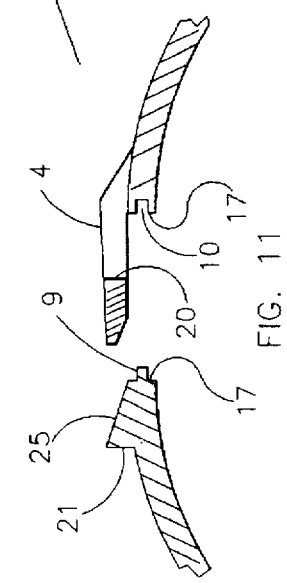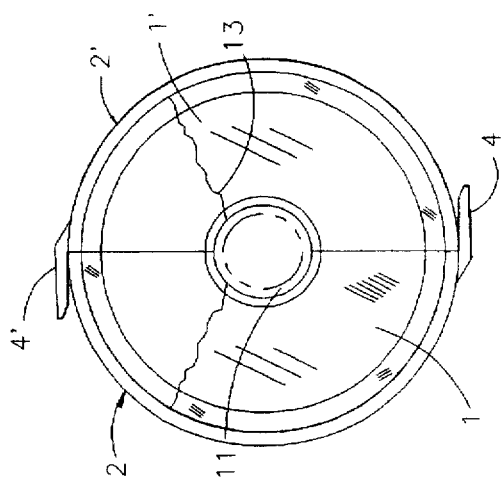

INSULATING JACKET FOR HOT AND COLD PIPING SYSTEMS AND THE METHOD OF USE

This application is a division of application Ser. No. 08/184,013, filed Jan. 21, 1994. That application is a continuation-in-part of application Ser. No. 08/136,126, filed Oct. 15, 1993, now abandoned which describes a similar invention for use on a valve in a chilled fluid piping system. This application is an extension of the technology described in the above referenced application to its use on valves, pipe fittings, and pipe sections in hot fluid piping systems. Pipe fittings shall include but not be limited to 90° elbows, 45° elbows, tees, wyes, unions, reducers, caps, clean outs, traps, strainers, pressure reducers, actuators, flanges, flow restrictors, metering devices, and any other elements.

FIELD OF THE INVENTION

The herein disclosed invention is that of a multi-piece plastic removable and reusable insulation jacket for insulating valves in a chilled fluid piping system. More generally, this invention relates to an insulation cover for insulating any component in a fluid piping system including but not limited to valves, fittings, and pipe for temperatures of both below and above ambient.

BACKGROUND OF THE INVENTION

A significant void exists in the availability of effective insulation for pipes, valves, and fittings for low (sub-ambient) temperature fluids. The most common and effective insulation applications of pipe, valves and fittings are for high (above ambient) temperature fluids. Differential temperatures in the majority of low temperature installations are on the order of 100° F. or less compared to high temperature installations where differentials exceeding 1000° F. are not uncommon with the majority of these installations having differentials between 200° F. and 700° F. One can easily recognize the cost savings that will accrue from insulating high temperature piping systems while the actual cost savings of effectively insulating low temperature piping systems is not so obvious, because the comparatively small temperature differentials between a cold piping surface and a warmer and moist ambient environment is misleading in that, unlike high temperature piping installations, the ambient humidity becomes a dominat factor.

In high temperature piping applications ambient humidity is and remains in the vapor state, while in low temperature piping applications the ambient humidity or water vapor tends to condense or changes state from a vapor to a liquid or solid on the low temperature piping system surface. As heat is withdrawn from the ambient environment through heat gain by the cooler low temperature piping system, ambient water vapor molecules lose energy and concentrate in the boundary layer of the piping system surface. As ambient air near the piping system surface reaches its dew point, moisture begins to condense or freeze on the piping system surface and then cools to the surface temperature of the piping system. This change of state or phase for water is the result of the transfer to the chilled circulating fluid in the piping system of the vapor's latent heat of vaporization, which typically doubles the apparent heat gain from the ambient temperature change alone. Thus the value of effective low temperature insulation is double, on a thermal gain basis alone, what is typically perceived from only the temperature differential. Therefore, if an insulation system on low temperature piping systems is to be effective, the insulation system must economically isolate the piping system from the ambient moisture laden environment. The reason isolation is so important is because as insulation becomes wet with condensation the wet insulation looses its thermal resistance and the effectiveness of the insulation is diminished. Also, as ambient water vapor condenses on a chilled water piping system due to the insulation not totally isolating the piping system, a vapor pressure differential is developed between the inside and outside of the insulation. This vapor pressure differential is the force that causes the vapor migration to continue into the pipe insulation. Therefore effective low temperature pipe insulation must not only provide thermal resistance but also water vapor isolation and impermeability.

Today, low temperature or chilled water piping systems are insulated primarily for one or more of the following reasons:

1. Conservation of Energy.
2. Control and prevention of condensation.
3. Optimization of equipment sizing.
4. Process control.

By controlling and preventing condensation, designers also eliminate or minimize four problems commonly associated with chilled water insulation systems:

1. Dripping pipes that damage ceilings, walls, floors, equipment and/or furnishings.
2. Initiation of mold and mildew and the potential for associated health problems.
3. Corrosion of pipes, valves, and fittings promoted by water condensation and/or chemicals leached by the moisture passing through the insulation itself.
4. Heat gained from no or failed insulation.

Due to the above problems, the importance of effectively insulating chilled water systems cannot be understated.

Recent surveys have revealed that chilled water distribution systems have a high incidence of failure, as stated by an article titled "Insulating Chilled Water Systems" in Insulation Outlook magazine, May 1993. Failures occur even though many insulated chilled water distribution systems are typically indoors or in protected areas not subject to physical abuse or weather. The cause of failure is due to moisture which permeates the insulation material itself as well as the minor imperfections at joints and fittings. This moisture penetration is caused by driving vapor pressure differences prevalent between the outside of the insulation and the cold pipe surface. The results of failure in chilled water systems are dripping water from the insulated surface, pipe and fitting corrosion, increased operating costs due to lost efficiency, and mold/mildew formation.

While dripping condensation may be easily recognizable, moisture vapor intrusion is generally not obvious and can progress for relatively long periods of time before any visible evidence is noticed. During this period, not only has the insulation lost its thermal resistance due to moisture, but also the pipe and pipe fittings have been rusting and corroding. Disregarding the cost of replacing corroded valves, pipe and fittings, the insulation must be replaced and experienced engineers have suggested that replacement costs of just the insulation can easily run two to three times the initial installed insulation cost.

PRIOR ART

As discussed above, insulated chilled water systems are subject to a high degree of failure, particularly at joints and fittings. In fact, recent studies have shown that minor imperfections at these points have permeance values five to ten times higher than those from insulated pipe surfaces. Early efforts in the insulation of chilled water piping system fittings using methods and materials similar to those in high temperature piping systems, were completely ineffective in that they failed to incorporate barriers to prevent the migration and condensation of ambient moisture. Subsequent methods incorporated the use of cementitious or mastic coatings to provide adequate vapor barriers which usually failed upon even minor mechanical impact. Ultimately, metallic or plastic barriers were developed for use over insulation applied to the fitting surface. These materials have been preformed for use over pipe fitting insulation but likewise require field sealing of seams and interfaces using rivets, staples, adhesive or cements, tape and other postapplied materials with at best, limited success. There have been many attempts in the past to utilize removable insulation jackets designed for use on hot valves and adapt them for use on valves transporting chilled water. Although satisfactory for the application of heat retention, they have proved completely unsatisfactory when tried in chilled water applications. Almost without exception, these insulation jackets are used with, or are provided with, or are formed of fibrous or cellular foam-like insulation materials usually in the form of casing liners, casing-poured fill, or casing-injected fill.

Examples of this prior art include U.S. Pat. No. 4,716,926 (Jacobs), U.S. Pat. No. 4,046,406 (Press et al), U.S. Pat. No. 3,556,158 (Schneider), U.S. Pat. No. 1,108,840 (Franke), U.S. Pat. No. 3,724,491 (Knudsen), U.S. Pat. No. 4,207,918 (Burns et al), U.S. Pat. No. 4,259,981 (Busse), or U.S. Pat. No. 4,112,967 (Withem).

Some of these examples, particularly those utilizing a blanket type layer of heat insulating material inside of, or attached to, a casing, as does Jacobs, allow an air space for ease of closure around the valves of varying sizes and configurations. However, the claimed insulating capability in these instances results from the layer of heat-insulating material. But most significantly in these cases (Jacobs and Franke), vents or weep-holes render the casing enclosed air spaces non-isolated, allowing air movement and vapor intrusion, which immediately results in the failure of insulating integrity for service on a cold valve. Exceptions to the type of insulation jackets described above are the valve jackets described in U.S. Pat. No. 2,078,606 (Le Grand) and U.S. Pat. Nos. 2,613,166 and 2,841,203 (Gronemeyer). These jackets use multiple annuli, thus creating air spaces to effect thermal insulation. However, they are exclusively of metallic construction with a multiplicity of separate segments, spaces and fasteners which are very complex and expensive to fabricate and install. Le Grand goes to great lengths to minimize conductive heat transfer by the use of gaskets and stainless steel spacers and to minimize radiant heat transfer, but never once gives any clue or indication about sealing the exterior of the jackets to isolate the interior spaces from migrating water vapor in order to eliminate internal condensation on a low temperature piping system. The Gronemeyer patents discuss the migration of $H_2O$ vapor and indicates that they should be sealed by tape or caulk to seal out vapor migration into the jacket. However, all of the joints must be sealed by the tape or caulk.

All of the above examples of prior art have one other common drawback as they may apply to chilled water insulation systems. Even if the cited inventions were capable of effectively isolating the piping system from the surrounding atmosphere and could be manufactured economically, all are fabricated with materials such as fiberglass cloth or metal which are used as outer casings and which usually enclose a fibrous material for thermal insulation. This construction renders the jackets opaque. As pointed out previously, most chilled water systems have failed because there is usually no visible evidence in the initial stages of failure. This would have certainly been the case with any of these insulation jackets. However, a modular, transparent or translucent low temperature piping insulation system will visibly show any failure of the insulation system by the internal accumulation of condensation. Being modular, removable and reusable, the area of failure can be opened up, drained and resealed, reusing the insulation system components.

ASHRAE (American Society of Heating, Refrigeration and Air Conditioning Engineers) has recognized the special problems associated with insulating cold piping and is proposing a revision of its chapter on "Moisture in building construction" in its latest edition of "Fundamentals"—the guidebook to the consulting engineering community. ASHRAE states that moisture inevitably accumulates in permeable type insulation and, since "periodic replacement is the only known solution", the piping installation should be accessible for such replacement and should have a means for draining water that would otherwise cause damage.

As discussed in ASHRAE and the trade literature, there is a pressing need for low cost highly impermeable insulation in chilled water piping distribution systems which provides immediate detection of system failure and can be easily removed, should that failure occur, and can be easily replaced and resealed after the condensation is removed.

The use of an air gap, insulating jacket for hot and cold piping systems has been shown in the prior art, such as Le Grand. However, no one has proved that an air gap system can compete commercially with fibrous and foam insulations. The following sets forth the proofs of commercial competitiveness and therefore shows that a plastic membrane jacket is superior to the current state of the prior art for hot and cold fluid piping systems.

In order to develop and refine an environmentally benign (i.e. non-fibrous) air gap thermal insulation system, a testing program was commenced in cooperation with the, Department of Mechanical Engineering of the University of Maryland.

The primary purposes of the testing program were to determine the behavior of isolated volumes of air in terms of heat transfer resistance and to use the test results as a basis for developing air gap insulation devices which would be equivalent to existing, commercially available insulation products such as mineral fibers, synthetic foams and the like. Testing was conducted with fluid temperatures both well above and below ambient temperatures in order to determine differences in air gap behavior.

Several test apparati were constructed with the two, described below, providing the most useful and accurate results. The first apparatus consisted of parallel pipe sections of identical lengths each consisting of eight valves with pipe sections between valves in each parallel length. The valves on one length were fitted with singular annulus prototype air gap jackets while those on the parallel length were insulated with fiberglass and vinyl covers in accordance with industry practice. The pipe sections between valves on each length were covered with-foam insulation.

After preliminary testing to verify consistent, repeatable results, testing was initiated. Each test was run with fluid at a table inlet temperature and with equal monitored flows to each parallel length. Comparison of stable outlet temperatures with inlet conditions provided results allowing comparison of relative insulating performance between a single, non-optimized air gap and commercial insulation. The results of this set of tests show that the non-optimized air gap prototypes were not as efficient as a standard thickness of fibrous insulation.

In order to refine the comparison of relative performance, the parallel lengths were modified to consist of straight pipe lengths, so that varying sized radial air gaps installed on one length could be compared to varying thicknesses of commercial insulation installed on the other pipe length. However, prior to the commencement of this testing program, determination of the optimum air gap was made using a computer model. The heat transfer computer model of straight pipe geometry was formulated. Initially heat transfer calculations were made assuming that radiation effects were not present. Optimum air gaps were calculated using heat transfer rates due to conduction and convection.

As the temperature difference between the pipe surface and the surroundings rises, the contribution to heat transfer from radiation becomes significant. Therefore a radiation equation was included in the model to obtain a more precise model.

The air gap predictions, as obtained from the computer model, were compared to the experimentally obtained heat transfer rates for the straight pipes. The first group of tests involved the installation of one half inch thickness of foam insulation on one test leg and the fitting of acrylic jacket membranes insulation on the other test leg to create one or more air gaps or annuli. The radial air gap spacing was varied between test runs to determine behavior under different fluid temperature conditions. The results of this series of tests are displayed in FIG. 22 and Table 2 and show that the performance of two, one-quarter inch wide air gaps performed roughly equal to the same overall radial thickness of foam insulation.

The next set of tests was conducted on a standard test apparatus as shown and described in Standard C-335 of the American Society for Testing and Materials (ASTM). The test results shown in FIG. 23 indicate results similar to the previous test in that a series of concentric annuli can be used to provide insulating performance equal to or even exceeding the same thickness of fibrous insulation. The range of optimum air gap thicknesses is 0.25 inches to 0.50 inches. However, at low temperature differentials between the pipe surface and the surroundings an air gap of larger than 0.50 inches can be effective.

SUMMARY OF THE INVENTION

The object of this invention is to provide an insulating valve jacket of thermoplastic for a valve in a chilled water system which can seal the valve off from the surrounding ambient environment thereby providing an effective vapor barrier to prevent the migration of moisture to the valve's cold surface and thus prevent the formation of condensation on the valve or insulation.

It is also the object of this invention to provide an insulating valve jacket of thermoplastic in a chilled water system which is designed to utilize the optimum air gap of one quarter inch, trapped between the valve jacket and the valve to provide effective insulation as determined in the recent University of Maryland research program.

It is also the object of this invention to provide an insulating valve jacket in a chilled water system which is at least partially made of clear, transparent or translucent, thermoplastic to permit observation of the valve and to determine possible system failure.

It is also the object of this invention to provide an insulating valve jacket in a chilled water system which can be easily removed once failure is observed, the moisture drained, and the valve jacket easily reinstalled and resealed all without the use of tools.

To this end, an insulating jacket for a valve in a chilled water system has been provided which consists essentially of two identical thermoplastic sections to cover the valve body and a thermoplastic section to cover the valve handle which all interlock and seal together. Additionally, thermoplastic adapto collars of identical pieces interlock, snap together and seal around and seal to the valve insulating jacket and the adjoining pipe insulation.

In practice, this design concept could be applied to all kinds of pipe fittings, and the pipe of a chilled water system or other hot or cold fluid distribution systems. Also, additional optimum air gaps could be built into the valve jacket wall to increase thermal efficiency and one or more of these air gaps could be evacuated to provide even more thermal efficiency. The air gap space could also be filled with any kind of insulation material to provide other insulation characteristics.

Also in practice, this design concept could be used as a means to prevent pipe, valves, and fittings from freezing, either with or without heat tracing.

A most significant object is to conserve energy in an efficient and cost effective manner.

Another significant object is to utilize low permeability, clear, transparent or translucent, recycled or virgin thermoplastics to mold all the necessary valve jacket components.

BRIEF DESCRIPTION OF THE DRAWINGS

The invention of this application will be better understood when viewed with the following drawings wherein:

FIG. 1 is a perspective view showing an insulating valve jacket complete with removable valve handle cover and adapter collars connecting the valve jacket to the adjoining pipe insulation, in accordance with the present invention.

FIG. 2 is an exploded perspective view of FIG. 1 showing only four of the seven pieces with all three different pieces shown that make up the complete valve jacket assembly.

FIG. 3 is a front view of the installed valve jacket of FIG. 1 complete with valve handle cover and adapter collars connecting the valve jacket to the adjoining pipe insulation.

FIG. 4 is an end view of FIG. 3.

FIG. 5 is a bottom view of FIG. 3.

FIG. 6 is a top view of FIG. 3.

FIG. 7 is a vertical section taken through the axial center line of the complete valve jacket assembly, substantially along the line 7—7 of FIG. 4 in the direction of the arrows thereon.

FIG. 7A is an enlargement of the adapter collar connection to the valve jacket.

FIG. 8 is a vertical section substantially along the line 8—8 of FIG. 6 in the direction of the arrows thereon.

FIG. 9 is a vertical section substantially along the line 9—9 of FIG. 6 in the direction of the arrows thereon.

FIG. 10 is a vertical section substantially along the line 10—10 of FIG. 6 in the direction of the arrows thereon.

FIG. 11 is an enlarged view of the top portion of FIG. 10 with the two parts separated.

DETAILED DESCRIPTION OF THE PREFERRED EMBODIMENTS

Figure 12:
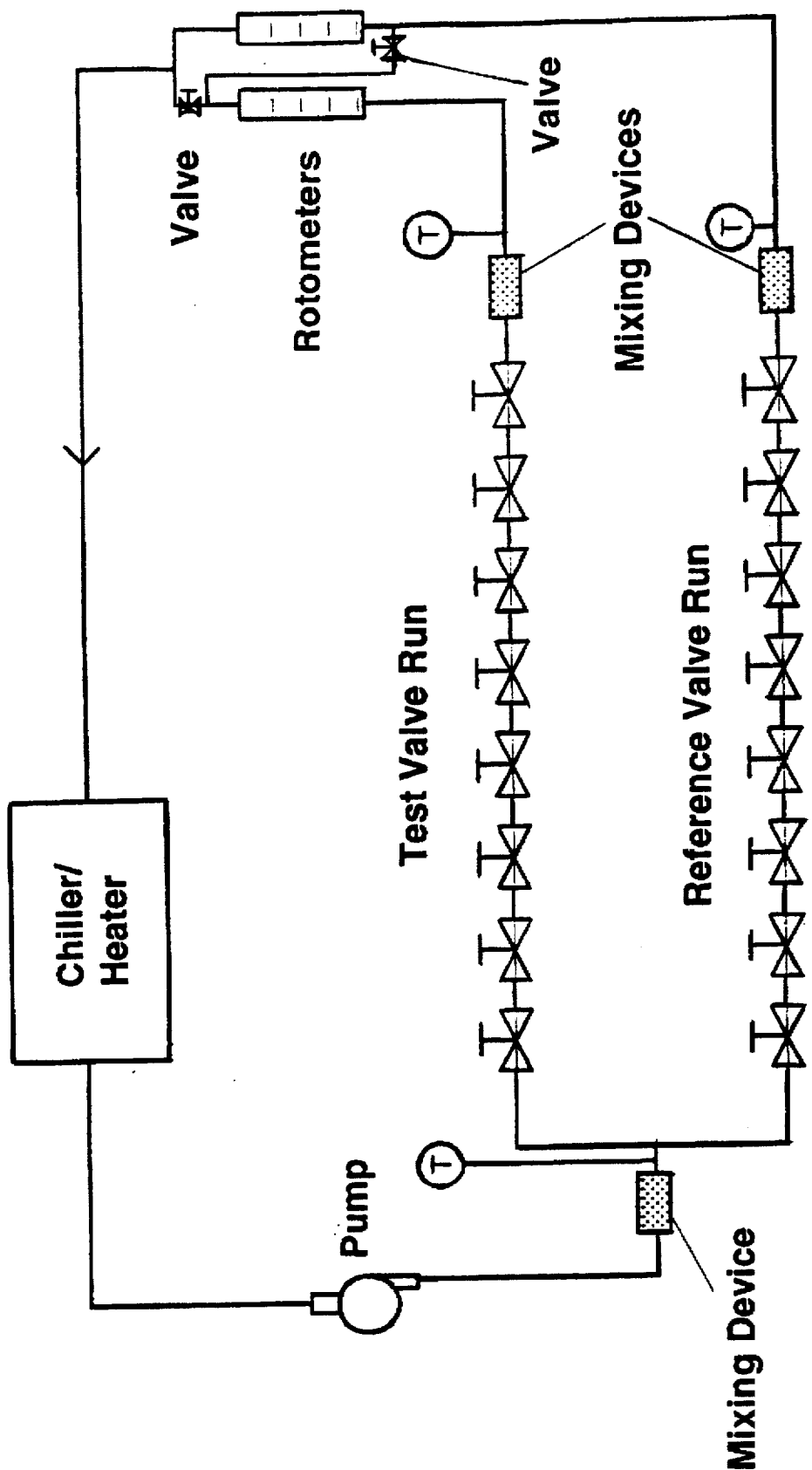
FIG. 12 is a schematic view of a testing apparatus.

Referring now to the drawings wherein like reference numerals denote like elements throughout the several views, and primed numerals denote an identical part in a different orientation, FIG. 1 illustrates an installed valve jacket assembly complete with two valve jacket halves 1 and 1', valve handle cover 3, and two pairs of adapter collar halves 2 and 2' connecting the valve jacket halves 1 and 1' to the adjoining pipe insulation 13 covering pipes 11 on both sides of the valve 12, showing all seven pieces of valve jacket assembly of which there are three different piece configurations 1, 3 and 2 all in accordance with the preferred embodiments of the present application.

In addition to valves, this preferred embodiment could also be used for insulating any other type of pipe fitting including but not limited to 90° elbows, 45° elbows, tees, wyes, unions, reducers, caps, clean outs, or any other pipe line components including but not limited to traps, strainers, pressure reducers, actuators, flanges, flow restrictors, metering devices, and including but not limited to pipe, and other elements of well known nature. From the following detailed description, the manner of adapting the invention to these other conditions will be readily apparent to those skilled in the art.

FIG. 2 is an exploded perspective view of FIG. 1 with only four of the seven pieces shown, for clarity, that make up the valve jacket assembly of FIG. 1. First, the preferred embodiment of the valve jacket halves 1 and 1' that encloses valve 12 is that of two identical halves 1. Another less preferred embodiment is where two valve jacket pieces would be different in configuration. Also the two identical valve jacket halves 1 and 1' or the two valve jacket halves each of a different configuration could be connected together by a feature like but not limited to a live hinge molded integral with the two parts, for example along the bottom edge, rendering the identical 1 and 1' or different configuration valve jacket pieces as a single component. The valve jacket halves 1 and 1' when assembled together surrounding valve 12 are located and held in position straddling valve 12 by contact of cylindrical surfaces 7 of valve jacket halves 1 and 1' against pipes 11 on each side of valve 12. The cylindrical surfaces 7 must seal against pipes 11 to provide a barrier against the migration of water vapor across this interface. This seal can be accomplished many different ways including but not limited to providing a caulking material on this interface, a gasket material, or an "O" ring in an appropriate groove, not shown, in the cylindrical surface 7 of the valve jacket halves 1 and 1', or a snug fit of cylindrical surfaces 7 around pipes 11. Cylindrical surface 7 has purposely been made wider than the wall thickness of the valve jacket halves 1 and 1' to provide for a more stable purchase on pipes 11 and to provide a larger sealing surface between the cylindrical surfaces 7 of the valve jacket halves 1 and 1' and pipes 11, in order to prevent the migration of water vapor across this interface of cylindrical surfaces 7 and pipes 11.

The two identical valve jacket halves 1 and 1' when fitted and pressed together around valve 12 and pipes 11, are held together by a latching system formed by tabs 4 that slide up the surface 25 of ramped projections 6 and when tongues 9 fully engage in grooves 10 of the mating faces 14 of the valve jacket halves 1 and 1', then tabs 4 snap closed so that the surface 20 of tabs 4 bears against surface 21 of ramped projection 6 holding the valve jacket halves 1 and 1' together. The tabs 4 and ramped projections 6 are preferred to be molded integral with the valve jacket halves 1 and 1'. The tabs 4 have a beveled surface 22 to facilitate engagement with surface 25 of the ramped projections 6. As the tabs 4 progress up the ramped projections 6 during assembly, tabs 4 are deflected outward stressing the cantilever tabs 4 until surface 20 of each tab 4 goes just beyond surface 21 of each ramped projection 6, at which time the deflected and stressed tabs 4 "snap closed", returning to their undeflected position and unstressed state engaging surface 20 of each tab 4 with surface 21 of each ramped projection 6. As with assembly, the valve jacket halves 1 and 1' may be disassembled without tools by using one's fingers to pry up the projecting end and deflect and stress each cantilevered tab 4 in succession on the valve jacket halves 1 and 1' so the surfaces 21 and 20 no longer contact, thus permitting the valve jacket halves 1 and 1', to separate and come apart, with the tabs 4 returning to their undeflected and unstressed position, rendering the valve jacket halves 1 and 1' reusable. It is understood that the valve jacket halves 1 and 1' can be held together in many other ways and is not limited to the previously described manner.

The mating faces 14 of the valve jacket halves 1 and 1' seal together by means of an interference fit of tongue 9 in groove 10 so the resulting seal will prevent the migration of water vapor from the ambient environment into the internal cavity formed around valve 12 by the valve jacket halves 1 and 1'. The interference fit of the tongue 9 in the groove 10 is caused by the tongue 9 being wider than the groove 10 creating a press fit of the two parts producing a seal. A preferred embodiment is that the tongue 9 and the groove 10 be molded integral with the valve jacket halves 1 and 1'. The sealing of the faces 14 of the valve jacket halves 1 and 1' could be accomplished in many other ways such as but not limited to using a caulking material, or an adhesive, a gasket material or "O" ring between the faces 14. For example, the functions of sealing and holding the valve jacket halves 1 and 1' together may be accomplished simultaneously by a circular bead with an undercut in place of the tongue 9 and a circular groove 10 with an undercut on mating faces 14, such that as the valve jacket halves 1 and 1' are hand pressed together around pipes 11 and valve 12, the circular bead snaps into the circular groove, thus sealing and holding the valve jacket halves together. It is understood that there are many other geometries that can be used to accomplish this function. The valve jacket halves 1 and 1' can be injection molded from any of the wide variety of injection moldable plastics, and a preferred characteristic is that the plastic be clear, transparent, or translucent such that water vapor condensation accumulation inside the installed valve jacket assembly can be observed, indicating a failure of the sealing of the valve jacket assembly. Also a leak of the process fluid in pipes 11 and valve 12 within the valve jacket assembly can also be detected by using a clear, transparent, or translucent plastic for any or all of the valve jacket assembly pieces. It is desirable but not necessary to have the features of the valve jacket halves 1 and 1' like or similar to those shown in FIG. 2, because the part has no under cuts and can be injection molded with open-shut tooling requiring no side pulls, inserts, or other similar mechanisms. Different size valve jacket halves 1 and 1' would be provided for the various standard pipe and valve sizes. Cylindrical surface 7 in valve jacket halves 1 and 1' could be part of an interchangeable insert in this area of the valve jacket halves 1 and 1', particularly for the smaller pipe and valve sizes where there is little difference in the over all size of the valve 12, and cylindrical surface 7 of the inserts would be sized to match and seal to the size of pipes 11.

The valve handle cover 3 shown in FIG. 1, and in FIG. 2, and in section in FIG. 7 is installed after the valve jacket halves 1 and 1' are snapped together locating on pipes 11 and around valve 12. The valve handle cover 3 is so dimensioned as to provide ample interior space for a rising stem valve handle 18 to be in the fully open position and still have sufficient clearance between the valve handle 18 and the top of the valve handle cover 3. Valve handle cover 3 also seals to the top annular face 16 that is formed when the two valve jacket halves 1 and 11 are snapped together on pipes 11 and around valve 12. It will be realized that this seal can be obtained by a wide variety of configurations and means, including but not limited to elastomeric materials, gaskets of various types and kinds, sealants, snap lock seams, and interference fits such as a circular bead in a circular socket, or a wedge shape in a wedge shaped socket. As an example for the presently preferred embodiment, the open end of the valve handle cover 3 is lowered over the valve handle 18 and inside the circular portion 16 of the valve jacket halves 1 and 1'. The chamfer 19 on the lower outer edge of the valve handle cover 3 assists the engagement with the top annular face 16 of the valve jacket halves 1 and 1'. The valve handle cover 3 is fully engaged when annular surface 35 of valve handle cover 3 seals against the top annular 16 of the valve jacket halves 1 and 1' and the projection 23 of valve handle cover 3 snaps over the extended corner 5 of the top annular face 16 of valve jacket halves 1 and 1', to hold the valve handle cover in place, and to provide a seal against the migration of water vapor from the ambient environment into the internal cavity formed around valve 12 by the valve jacket halves 1 and 1' and the valve handle cover 3. Also included but not specifically illustrated herein are screw threads of any appropriate configuration at the cylindrical surface 30 of the valve handle cover 3 and the mating cylindrical surface 29 of the valve jacket halves 1 and 1', such that by rotating the valve handle cover 3 about the center line of the valve stem 24, relative to the valve jacket halves 1 and 1', the projection 23 of the valve handle cover 3 will engage and seal against the extended corner 5 of the top annular face 16. By rotating the valve handle cover 3 the opposite direction as before, the screw threads at the interface of cylindrical surfaces 30 and 29 will disengage the valve handle cover 3 from the top annular face 16, thus breaking the seal and separating the two parts. A screw thread configuration that provides full engagement and sealing with only 90° rotation of the valve handle cover 3 relative to the valve jacket halves 1 and 1', is preferred. Another important reason that the valve handle cover 3 is easily removable and resealable, is to gain access to the valve handle 18 in order to make changes in the flow rate through valve 12 and reseal the valve handle cover 3 as described before. Preferably, the valve handle cover 3 can be injection molded from any of the wide variety of injection moldable thermoplastics, or rubber or rubber like material to provide a stretch seal. A preferred characteristic is that the material be clear, transparent, or translucent such that water vapor condensation accumulation inside the cavity containing valve 12 formed by the sealing together of the valve jacket halves 1 and 1' and the valve handle cover 3, can be observed indicating a failure of a seal, or a leak in the valve 12 can be detected, or the position of the valve handle 18 can be observed without removal of the valve handle cover 3.

As shown in FIG. 1 and in more detail in FIG. 2, and FIG. 7, and FIG. 7A, the adapter collar halves 2 and 2' connect and seal to the valve jacket halves 1 and 1', and seal to the pipe insulation 13 of the pipes 11 extending from each side of valve 12, and also the faces 17 of each collar half 2 seals to the adjoining faces 17 of the other collar half 2' by an interference fit tongue 9 in groove 10 as on the valve jacket halves 1 and 1'. Although there are many different ways to accomplish the sealing of the adjoining pipe insulation 13 to the valve jacket halves 1 and 1', a preferred method is by using adapter collar halves 2 and 2' as hereinafter described.

The preferred embodiment of the adapter-collar halves 2 and 2' is that they are identical pieces, and two pieces are employed on each end of the valve jacket halves 1 and 1', for a total of four adapter collar halves 2 in the valve jacket assembly as shown in FIGS. 1, 3, 5 and 6. Another less preferred embodiment is where two adapter collar halves would be different in configuration. Also the two identical adapter collar halves 2 and 2' or the two adapter collar halves, each of a different configuration, could be connected together by a feature like but not limited to a live hinge molded integral with the two parts, rendering the identical 2 and 2' or different configuration adapter collar halves as a single component.

The two identical adapter collar halves 2 and 2' when fitted and pressed together around the pipe insulation 13 and the valve jacket halves 1 and 1', are held together by tabs 4 that slide up the surface 25 of ramped projections 6 and when tongues 9 fully engage in grooves 10 of the mating faces 17 of the adapter collar halves 2 and 2', then tabs 4 snap closed so that the surface 20 of tabs 4 bears against surface 21 of the ramped projections 6 holding the adapter collar halves 2 and 2' together. The tabs 4 and ramped projections 6 are preferred to be molded integral with the adapter collar halves 2 and 2'. The tabs 4 have a beveled surface 22 to facilitate engagement with surface 25 of the ramped projections 6. As the tabs 4 progress up the ramped projections 6 during assembly, tabs 4 are deflected outward stressing the cantilever tabs 4 until surface 20 of each tab 4 goes just beyond surface 21 of the ramped projection 6 at which time the deflected and stressed tabs 4 snap closed, returning to their undeflected position and unstressed state engaging surface 20 of tabs 4 with surfaces 21 of ramped projections 6. As with assembly, the adapter collar halves 2 and 2' may be disassembled without tools by using one's fingers to pry up the projecting end and deflect and stress each cantilevered tab 4 in succession on the adapter collar halves 2 and 2' so the surfaces 21 and 20 no longer contact, thus permitting the adapter collar halves 2 and 2' to separate and come apart, with tabs 4 returning to their undeflected and unstressed position, rendering the adapter collar halves 2 and 2' reusable. As also applicable with the valve jacket halves 1 and 1', when the adapter collar halves 2 and 2' are permitted to separate, the tongue 9 sealing in groove 10 with an interference fit also separates so that the valve jacket halves 1 and 1' and the adapter collar halves 2 and 2' can be reused and resealed. The adapter collar halves 2 and 2' can be held together in many other ways and is not limited to the previously described manner. The mating faces 17 of the adapter collar halves 2 and 2' seal together by means of an interference fit of tongue 9 in groove 10 so the resulting seal will prevent the migration of water vapor from the ambient environment into the internal cavity formed around the pipe 11 by the adapter collar halves 2 and 2', the pipe insulation 13 and the outside end of the valve jacket halves 1 and 1'. The interference fit of the tongue 9 in the groove 10 is caused by the tongue 9 being wider than the groove 10 creating a press fit of the two parts producing a seal. A preferred embodiment is that the tongue 9 and the groove 10 be molded integral with the adapter collar halves 2 and 2'. The sealing of the faces 17 of the adapter collar halves 2 and 2' could be accomplished in many other ways such as but not limited to using a caulking material, an adhesive, a gasket material or "O" ring between the faces 17. The adapter collar halves 2 and 2' can be injection molded from any of the wide variety of injection moldable thermoplastics, and a preferred characteristic is that the plastic be clear, transparent, or translucent such that water vapor condensation accumulation inside the cavity formed by the installed adapter collar halves, can be observed, indicating a failure of the sealing of the adapter collar halves 2 and 2' to each other, the pipe insulation 13 and or to the valve jacket halves 1 and 1'. Also a leak of the process fluid in the pipes 11 can be detected by using a clear, transparent, or translucent plastic for the adapter collar halves 2 and 2'. It is desirable but not necessary to have the features of the adapter collar halves 2 and 2' like or similar to those shown in FIG. 2, because the part has no undercuts and can be injection molded with open-shut tooling requiring no side pulls, inserts, or other similar mechanisms. Different size adapter collar halves would be provided for the various standard thicknesses of pipe insulation for a given standard pipe size. Thus for a given pipe size and the associated valve jacket halves 1 and 1', adapter collar halves would be selected to correspond to the thickness of pipe insulation and the given associated valve jacket halves 1 and 1' for that pipe size.

When the adapter collar halves 2 and 2' are assembled together surrounding and sealing to the pipe insulation 13, and attaching to the valve jacket halves 1 and 1', they are located and held in position by and seal to the circular tongue 31 that is formed by the flat circular surfaces 28 and the cylindrical surface 15 on each end of the valve jacket halves 1 and 1'. The seal between the cylindrical surface 26 and the pipe insulation can be accomplished many different ways including but not limited to providing a caulking material or grease or semi-liquid on this interface, a gasket material, an "O" ring in an appropriate groove, not shown, in the cylindrical surface 26, a snug fit of cylindrical surface 26 around the pipe insulation 13, or circular or helical ridges, not shown, on cylindrical surface 26 that press into the pipe insulation 13 providing a seal. The specific configuration of the seal of cylindrical surface 26 to the pipe insulation 13 will be determined by the physical dimensions, properties, and characteristics of the specific pipe insulation 13 encountered. The pipe insulation may include but not be limited to fiberglass, elastomeric foam, foam glass, or isolated air gap.

Although there are many different ways to accomplish the sealing of the adapter collar halves 2 and 2' to the valve jacket halves 1 and 1', a preferred method is shown in FIG. 7, and shown in more detail in FIG. 7A. The circular tongues 31 on both ends of the valve jacket halves 1 and 1' are formed by the flat circular paralleled surfaces 28 and the cylindrical surface 15. This circular tongue 31 is a press fit into the groove 32 formed by the flat circular parallel surfaces 27 and the cylindrical surface 8 of the adapter collar halves 2 and 2'. As the two adapter collar halves 2 and 2' are pressed together, the circular tongue 31 is pressed into the circular groove 32 because the width of the circular groove 32 is slightly narrower than the thickness of the circular tongue 31. To facilitate the assembly of the interference press fit of the circular tongue 31 in the circular groove 32, that provides the seal, the edges of the circular tongue 31 are chamfered, detail not shown on the drawings, to ease their engagement. Also the inside diameter of the cylindrical surface 8 of the adapter collar halves 2 and 2' is always a little larger than the outside diameter of the cylindrical surface 15 of the valve jacket halves 1 and 1' so that the two cylindrical surfaces 8 and 15 upon assembly of these components, do not contact each other for any significant portion of their respective circumferences, so as not to interfere with the sealing of the circular tongue 31 in circular groove 32. There are many variations of the details of providing a seal between the adapter collar halves 2 and 2' and the valve jacket halves 1 and 1', and one preferred variation would be to taper either the circular tongue 31 and/or the circular groove 32 such that the resulting interference press fit seal would tend to axially center the assembled adapter collar halves 2 and 2' on the axil center of the valve jacket halves 1 and 1'.

The mechanism of how the isolated air gap insulation system works for a valve in a chilled water system is as follows, with this same mechanism being equally applicable to any type of fitting and pipe. The isolated air gap insulation concept is to form a jacket of one or more portions that completely surrounds a valve in a chilled fluid system so that the air space between the valve and the surrounding jacket is isolated or completely sealed off from the ambient environment. The seal does not have to be pressure tight, but it must provide a barrier to the migration of water vapor from the ambient environment to within the air space inside the valve jacket. Specifically and practically, when a valve jacket is physically and properly installed, the valve jacket will trap ambient water vapor in the enclosed isolated space inside the valve jacket. This trapped water vapor will condense on the chilled valve. The results of actual tests that were conducted using an injection molded clear plastic prototype valve jacket, demonstrated that the amount of condensation inside the valve jacket was only enough to dampen the surface of the valve with very small droplets of water that did not collect and drop off the valve. However, the valve jacket assembly could be made to be pressure tight.

It should also be noted that the valve jacket material does not have to have significant insulating properties because the isolated air space between the valve and the valve jacket provides the insulating properties of the invention. It is within the scope of this invention to add any type of insulation material such as but not limited to perlite, vermiculite, styrofoam, fiberglass, or other types of foam, or some type of mixture of gas or gasses inside the valve jacket.

A preferred embodiment of the invention is that the valve jacket or a portion of the valve jacket be of a clear, transparent, or translucent material so that condensation accumulation inside the valve jacket can be observed with excess condensation indicating a failure in the valve jacket sealing and or so that a leak of the process fluid from the valve or pipes can be observed and or the position of the valve handle can be observed indicating the amount the valve is open or closed.

Research Results

The idea of using a "trapped" pocket of air as thermal insulation is not new. It has been applied by manufacturers of multiple pane windows and storm windows for years to reduce energy losses in buildings. The idea has also been used extensively in the design of glazing for solar collectors. Another possible application, which is the focus of this paper, is in thermal insulation of piping systems. The air-gap insulation systems considered here have numerous beneficial features including low cost, reduced installation time and avoidance of possible health risks associated with conventional fibrous insulation materials. The main question in the design of air-gap insulation is how much the natural convection in the air-gap will degrade the insulating value. The answer depends strongly on the shape and orientation of the air gap. By optimizing the air gap configuration, very effective piping insulation systems cane designed.

Considerable research has been done on natural convection in closed cavities. The references listed here provide a starting point for the reader interested in the literature on this topic. The work on natural convection heat transfer in annuli prior to 1961 is reviewed by Liu et al. (1961) as an introduction to their experimental heat transfer study and correlation effort. Also in the 1960's, the effect of baffles was studied by Lis (1966). At the same conference, Grigul and Hauf (1966) presented interferometer results showing several characteristic flow regimes. Sadhu et al. (1975) studied the effects of inclination and eccentricity on heat transfer. In 1976, Kuehn and Goldstein (1976a) began a collaboration that ultimately produced several keystone papers (Kuchu and Goldstein, 1976b; Kuchu and Goldstein, 1978) describing major theoretical and experimental research on the subject. Ratzel et al. (1979) considered the problem from the perspective of wanting to reduce heat transfer losses from a solar collector tube. Kwon et al. (1982) did experiments and calculations involving baffles and confirmed the potential to reduce natural convection heat losses by up to 20%. Prusa and Yao (1983) studied the eccentric annulus and Tsui and Tremblay (1984) studied the transient convection problem, both numerically. A recent study by Naylor et al. (1989) shows that interest in this well studied problem continues. A large number of references to other geometries can be found in standard texts on heat transfer such as Incropera and Dewitt (1985) and Holman (1981).

The determination of the optimum air-gap design for insulation purposes can be formulated very simply for simple geometries, such as the annular geometry. Consider a fixed diameter pipe that is to be insulated. Now consider insulating the pipe with a very thin, concentric shell with air in the enclosed annulus. Assume that the thermal resistance of the shell wall is negligible. The problem reduces to choosing the diameter of the shell so as to minimize heat transfer. The natural convection in the annulus is well characterized by the Rayleigh number (Ra) defined as $$Ra = \frac{C_p \rho^2 g \delta^3 \beta \Delta T}{\mu k}$$

One interpretation of the Rayleigh number is that it represents the gravity induced "diffusion" divided by the thermal diffusivity. Thus, high values of Rayleigh number imply strong natural convection heat transfer effects. For the purpose of insulation, a small Rayleigh number is desirable. Assuming air in the annular gap, at known temperature and pressure, the properties gravitation constant (g), specific heat ($c_p$), density (p), viscosity ($\mu$), thermal conductivity (k) and the coefficient of thermal expansion ($\beta$) are all fixed. The remaining parameters which can influence the Rayleigh number are the gap width ($\delta$) and the temperature difference between the pipe and the shell ($\Delta T$). Increases in either parameter tend to increase the Rayleigh number (and hence tend to degrade thermal insulation). However, the gap width effect is more pronounced due to the cubic dependence. The well known conclusion is that the gap width and temperature difference must be kept small to minimize natural convection effects. Thus, from a natural convection perspective the gap should be made as small as possible.

However, even when natural convection effects are negligible, thermal conduction through the air in the gap still occurs. A simple conduction analysis shows that thermal resistance of a stationary gas is approximately proportional to the gap width. thus, as the gap width is made smaller, the conduction resistance decreases. Since the dependencies of conduction and natural convection on gap width have opposite signs an optimum gap width exists where the heat transfer resistance is maximized. For typical applications considered in this study, this optimum gap width was found to be approximately 7 mm. At gap widths below this value the heat transfer rate increases rapidly. At gap widths above this value, the heat transfer increases but with a much lower sensitivity to changes in the gap dimension.

The heat transfer analyses described above led to several insulation system designs for varying applications. The objective of the work reported here was to experimentally determine the performance of these designs. To evaluate alternative insulation systems an insulation test facility was designed and constructed in out laboratory.

A schematic of the experimental facility is provided as FIG. 12. The schematic shows 8 valves in each leg of the test facility but these valve legs are removable and were replaced by straight pipe sections for some tests. The facility was operated in a low temperature configuration with a commercial chiller and in a high temperature configuration with a separate heater. For the low temperature tests a 30% solution of ethylene glycol and water (30% ethylene glycol by mass) was used. The chiller provides temperature control with a integral heating element. The minimum fluid temperature was −17° C., limited by the freezing point of the glycol solution.

For high temperature tests water was used as the heat transfer fluid. The heater was constructed in our laboratory and consists of a 2 in. (5 cm) nominal steel pipe, vented to the atmosphere and fitted with an inlet, outlet and a 1.5 kW immersion heater element controlled by a variable transformer. For the high temperature tests, the system was run at constant power input. In both configurations the fluid is circulated by a centrifugal pump through two identical legs.

J-type thermocouples were used in conjunction with a digital voltmeter with a measurement accuracy of ±1 μV. The thermocouples were placed in wells constructed of 6 mm diameter copper tubing and each is electrically isolated from the apparatus. The wells are mounted on the pipe centerline and extend approximately 15 cm into the flowing fluid. This is achieved by mounting the well in a "T" fitting. Measurements include the differential temperatures between the common inlet and the outlets of each test leg, the temperature difference between the outlet fluid and the ambient air, and the absolute temperature of the fluid at the outlet referenced to an ice bath. Before testing began, the proper operation of the temperature measurement system was verified by placing both of the junctions of each differential thermocouple pair into the same well in the apparatus. In all cases, the voltage differences were less than the resolution of the voltmeter indicating the thermocouples were well matched.

Figure 13:
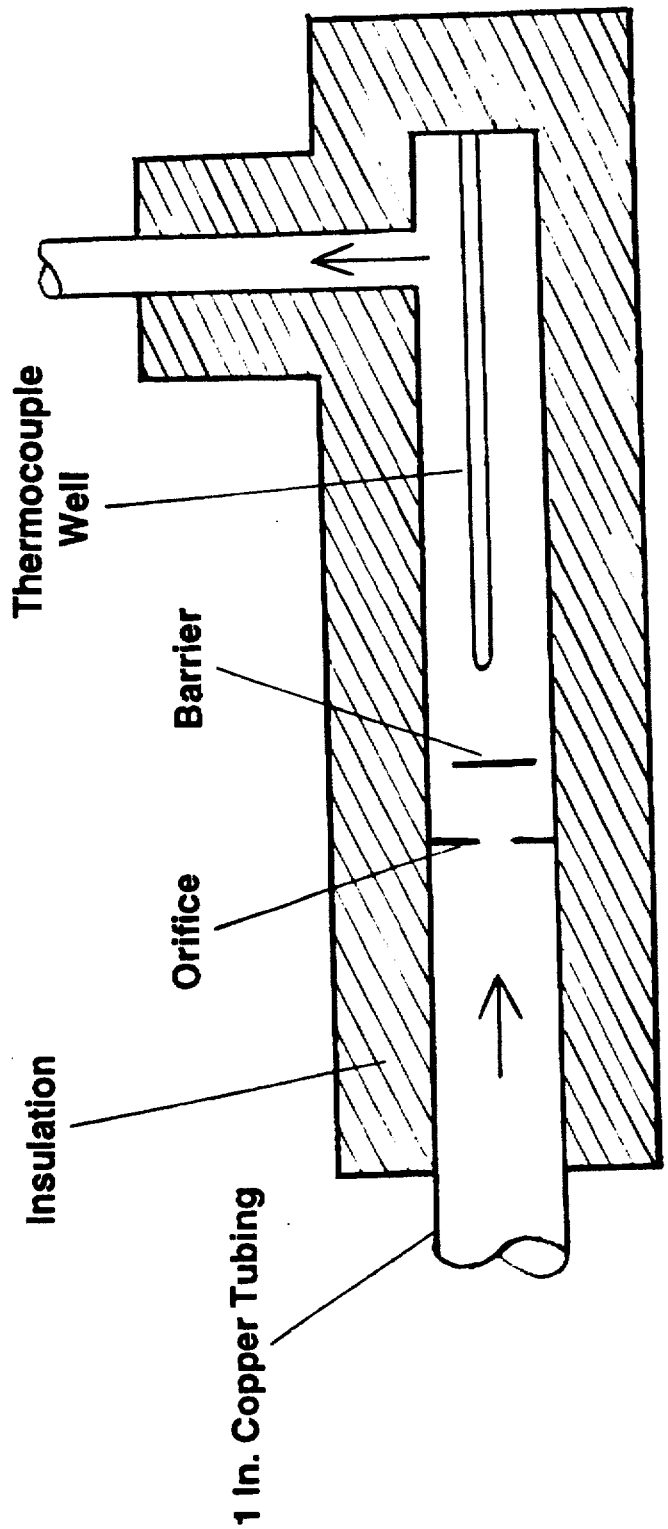
FIG. 13 is a schematic cross-sectional view of the mixing device used in the testing.

Fluid mixing devices were installed upstream of each of the inlet and outlet thermocouple wells to assure accurate measurement of the bulk fluid temperature at each location. The three mixing devices are identical and each is constructed of two thin copper disks which fit closely inside the tubing as shown in FIG. 13. The upstream disk has a 3 mm hole bored in its center. The downstream disk has a solid center and holes bored along its perimeter. As the fluid enters the mixing device its velocity is greatly increased forming a jet which impinges on the solid center of the downstream disk, effectively dispersing the thermal boundary layer.

Figure 14:
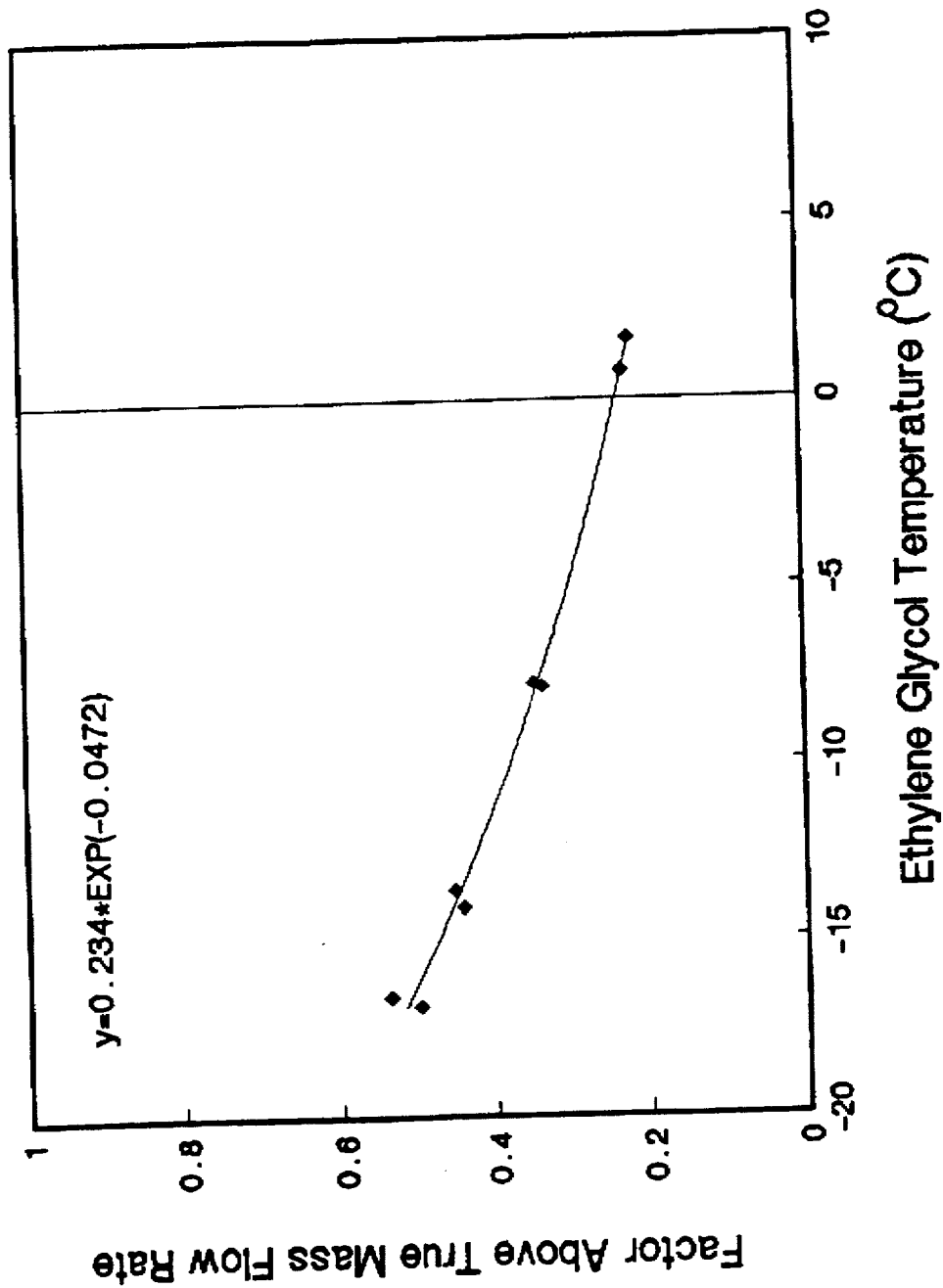
FIG. 14 is a calibration curve for the rotameter.

The flow rate is balanced through each run by adjusting the needle valves built into the rotameters. The repeatability of the rotameters is quoted by the manufacturer as 0.5% of full scale. The rotameters were found to be significantly influenced by viscous effects at low temperature. The magnitude of the effect was determined by calibrating the rotameters at several temperatures by collecting the glycol solution in a vessel during a measured time interval. The calibration data obtained along with an exponential curve fit are shown in FIG. 14.

A calibration of the two rotameters relative to each other was also performed. The hardware necessary for the relative calibration is shown in FIG. 12. In the calibration configuration the fluid is forced to pass through the test leg rotameter and the reference leg rotameter in series making it possible to directly compare their indicated flow rates. A correction on the order of 1% of the reading was obtained in this way and was used in balancing the two flow rates during testing.

At startup the fluid temperature was set to the desired level by adjusting either the chiller temperature setpoint or the power input to the heater. The indicated flow rate through each test leg was set equal to the maximum (1700 cc/min for the cold fluid tests, 1400 cc/min for the hot fluid tests) as governed by the pump capacity. The entire system was then allowed to approach equilibrium. After approximately three hours, the temperature changes were negligible and data collection began.

The temperature transducers were sampled and recorded at one minute intervals. To change the operating point, the flow rate was reduced by 100 cc/min., the system was allowed to approach equilibrium, and the above data collection procedure was repeated. This procedure was repeated until the minimum flow rate was reached. The minimum flow rate was governed by the mixing devices. Mixing problems were observed at low flow rates for the low temperature tests. Therefore, the minimum flow rate used for the cold tests was greater than that used for the hot tests.

Figure 15:
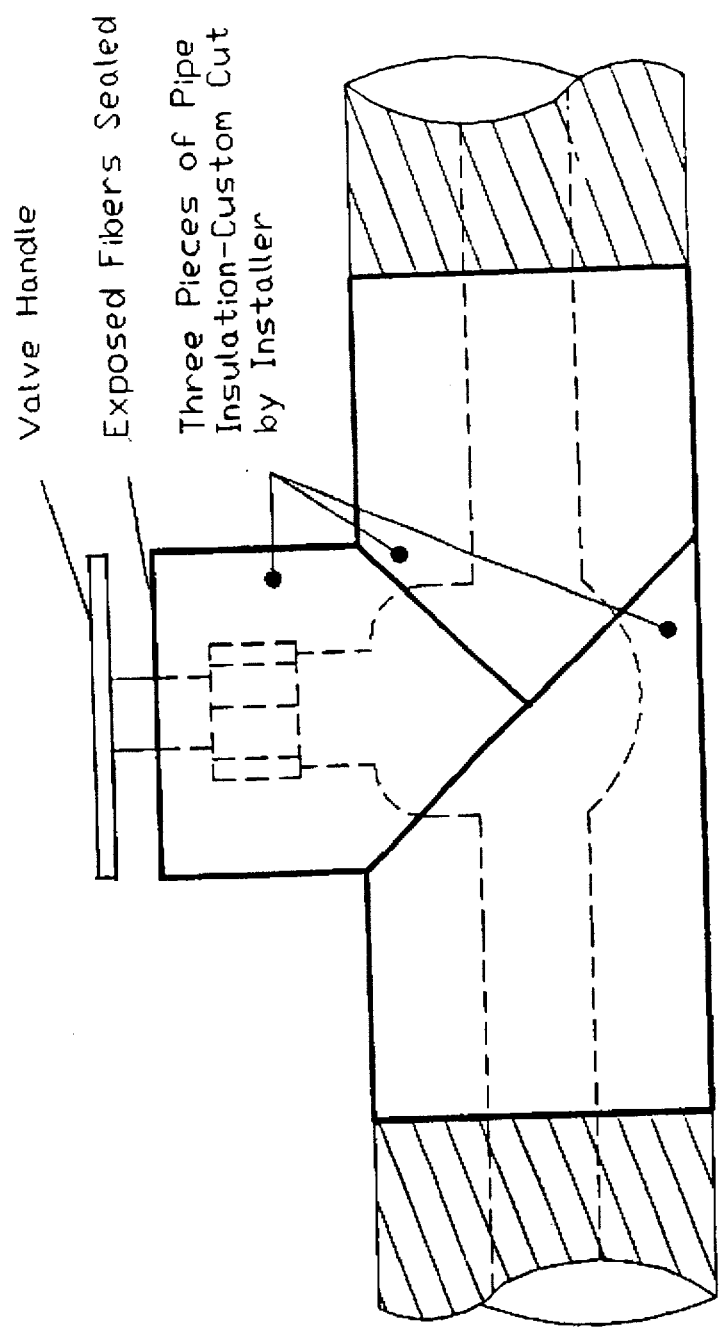
FIG. 15 is a schematic view of the fiber insulated valve.

Following current industry practice, valves and fittings in piping systems, both hot and cold, are typically insulated by "cutting and pasting" pieces of standard pipe insulation together as shown in FIG. 15. If the insulation is fibrous, a sealant is then applied to the exposed fibers to reduce moisture penetration for cold applications. For a system with many valves and fittings, the labor required for these operations is costly. Valve handles are typically left uncovered resulting in appreciable heat transfer along the valve stem. For cold applications the exposed handle is a cold surface on which water vapor tends to condense. The condensate can accumulate, run down the valve stem, and cause both degradation of the insulation and damage to the valve and piping through corrosion.

Figure 16:
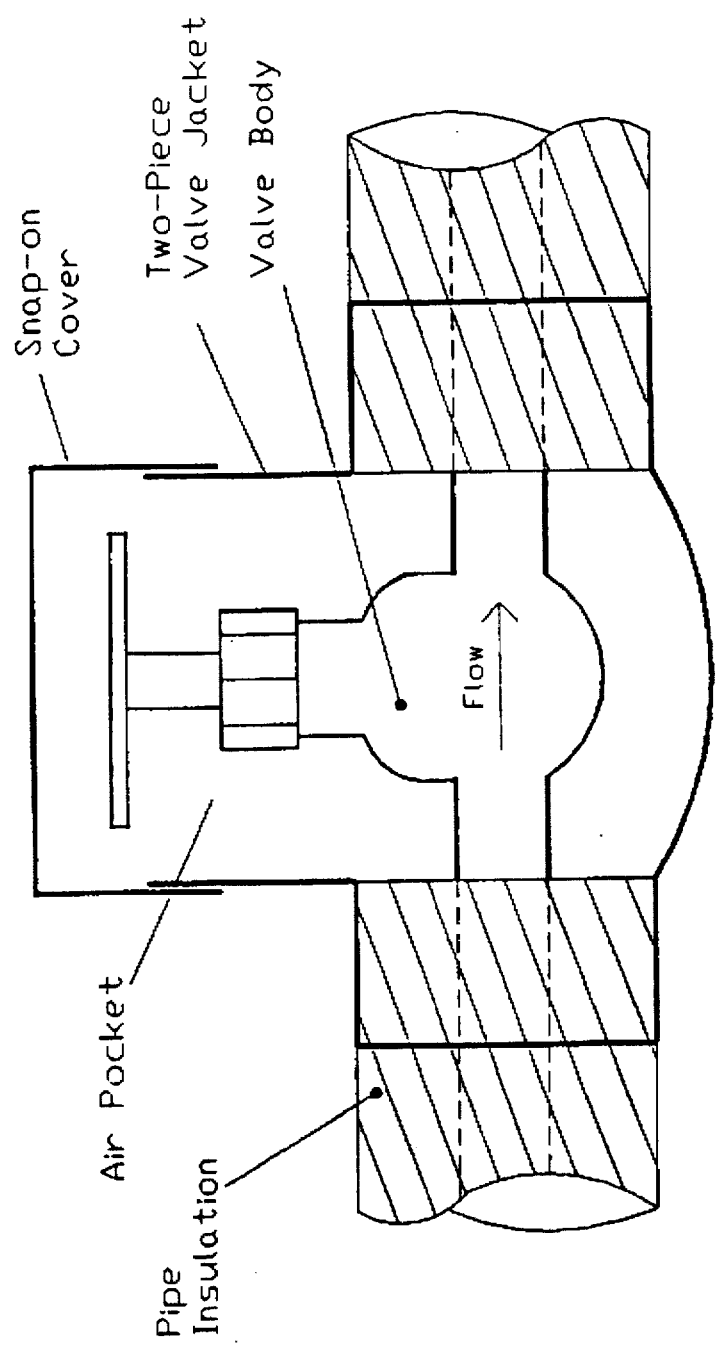
FIG. 16 is a schematic view of the air gap jacket insulated valve.

A prototype valve insulation jacket based on a trapped air gap was tested in our laboratory for both cold and hot fluids and found to provide good thermal insulation while eliminating the cold fluid condensation problem. The valve jacket prototype consists of a three piece, injection molded assembly with two identical sides and a snap-on cap which provides simple access to the valve handle as shown in FIG. 16. The two pieces which form the body of the jacket have tongue and groove seals and integrally molded snaps designed to fit snugly over the ends of the pipe insulation upstream and downstream of the valve. The jacket encloses the entire valve, including the handle, and locks out moisture while still allowing access to the valve.

For the valve insulation tests, the two legs consisted of eight one-inch valves spaced 30.5 cm center to center. All tests were run with the valves set at the full-open position. Each of the valves in the reference leg was insulated with standard fiberglass pipe insulation (the reference insulation) and the valves of the other leg were fitted with the insulation to be tested (for example, the valve jackets). The straight lengths of copper tubing between individual valves were insulated with closed-cell foam insulation on both legs. A separate calibrator pipe consisting of 1 in. nominal copper tubing insulated with the same closed-cell foam and interchangeable with the valve assemblies was used to measure and account for the heat transfer through these straight sections between the valves.

Figure 17:
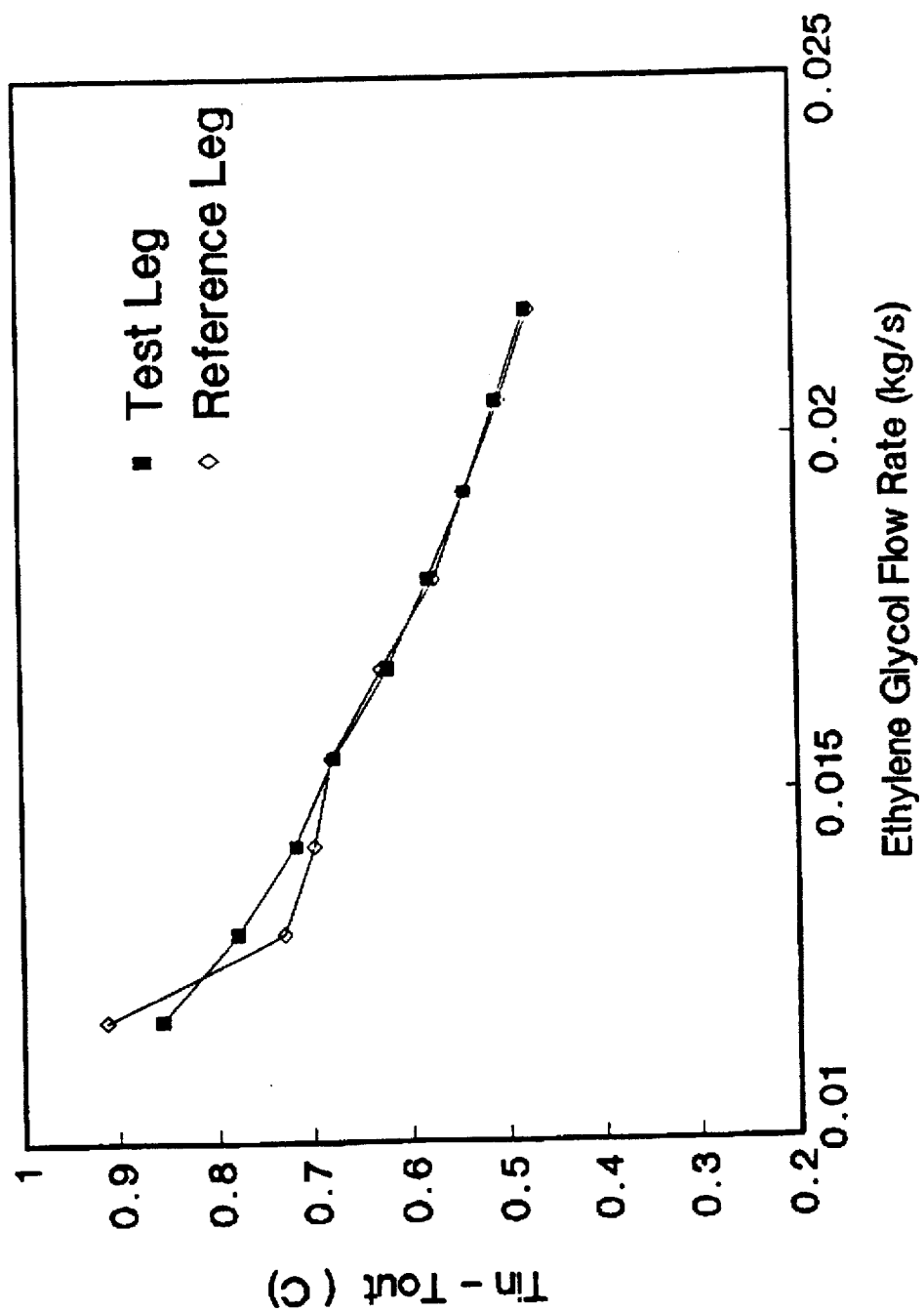
FIG. 17 is a graph of temperature difference of the test liquid between inlet and outlet versus flow rates for the testing apparatus.

An initial series of tests were run to establish the resolution and data scatter for the test facility. This was accomplished by installing identical fiberglass insulation on both the reference and test legs. A normal test sequence was then run and it was anticipated that both legs would yield identical results. The data from these tests is plotted in FIGS. 17 and 18. In FIG. 17 the temperature difference between the inlet and outlet of both runs is plotted for nine glycol flow rates. At each flow rate, the temperature difference for each leg should be identical. The small deviations observed represent the accumulated uncertainty associated with both the measurements and with small differences in the insulation installation.

The major heat transfer resistance in this system is the insulation itself. For the cold tests, the regime inside the tubes was developing laminar flow, whereas, for the hot tests, the flow was turbulent. In both cases, the heat transfer coefficients were such that the insulation resistance dominated. It was found that the overall heat transfer did not change appreciably with flow rate Thus the data form a hyperbola in the temperature difference versus glycol flow rate plane (as in FIG. 17). The heat transfer rate is sensitive to changes in the temperature difference between the heat transfer fluid and the ambient. Due to the limitations of our control systems, the glycol inlet temperature to the test section drifted somewhat when the flow rate was changed. In an effort to clarify these effects, the data from FIG. 17 is plotted again in FIG. 18 using a dimemsionless temperature difference, $\theta$, defined as $$\theta = \frac{T_{in} - T_{out}}{T_{amb} - T_{ave}} \cdot \frac{\dot{m}}{\dot{m}_{max}}$$

The data for both legs are essentially coincident at high flow rates where (m) is the mass flow rate, but some deviation is observed at low flow rates. This deviation is apparently due to mixing problems. The mixing device depends on the turbulent dissipation of the kinetic energy of the jet to provide a uniform temperature equal to the bulk temperature. At low flow rates, the kinetic energy of the jet is not sufficient to achieve complete mixing. Observation of mixing problems was used to establish the minimum flow rate used for subsequent tests.

Figure 18:
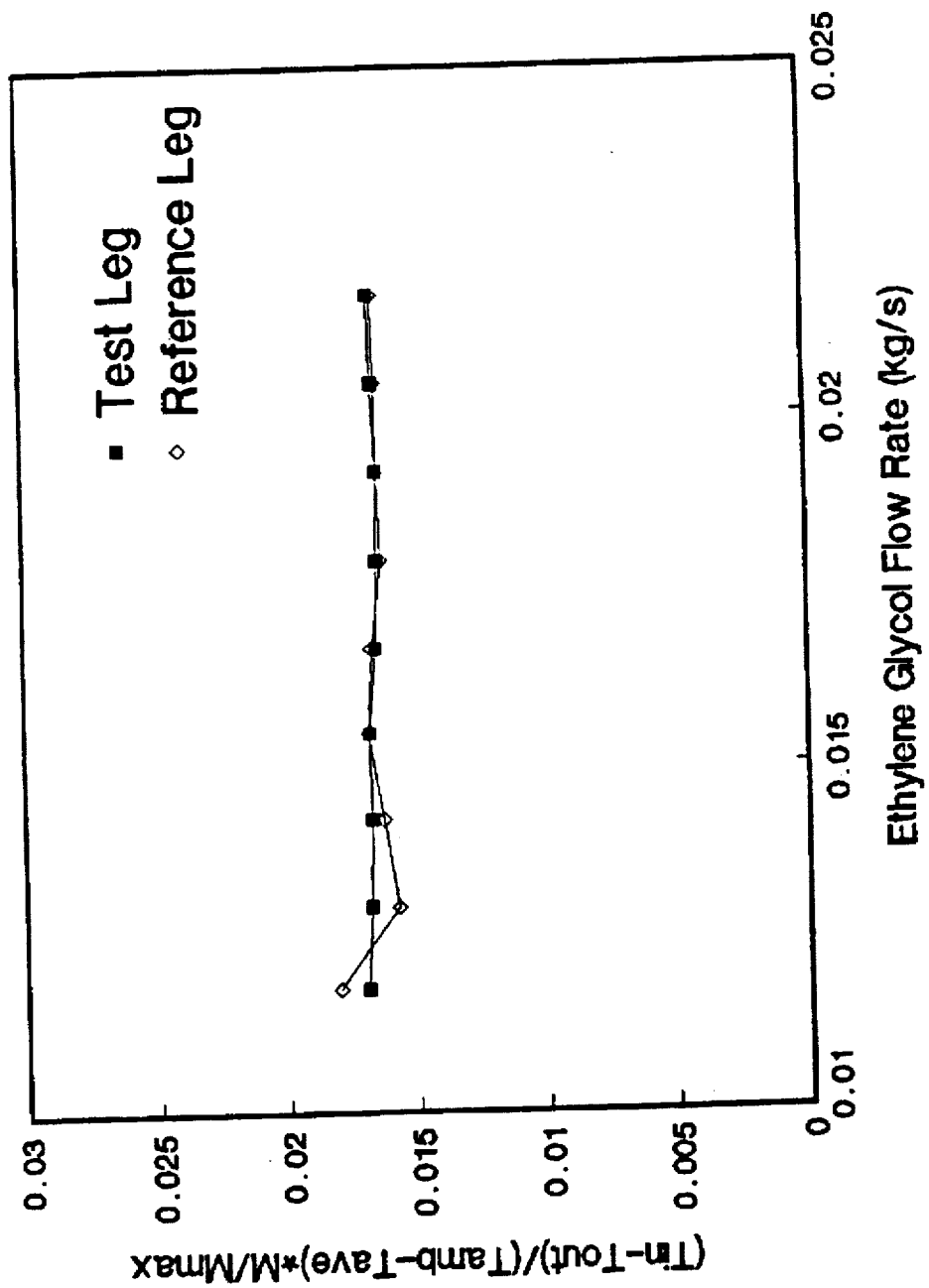
FIG. 18 is a graph of dimensionless temperature difference versus flow rates.

The data in FIG. 18 form a line with zero slope indicating that the dimensionless temperature difference is independent of glycol flow rate. This observation confirms the fact that the heat transfer resistance of the system is independent of the glycol flow rate. This format was used for subsequent data analyses because of the ease of interpretation. On these coordinates, a small value of dimensionless temperature difference indicates low heat transfer and, hence, good insulation.

Figure 19:
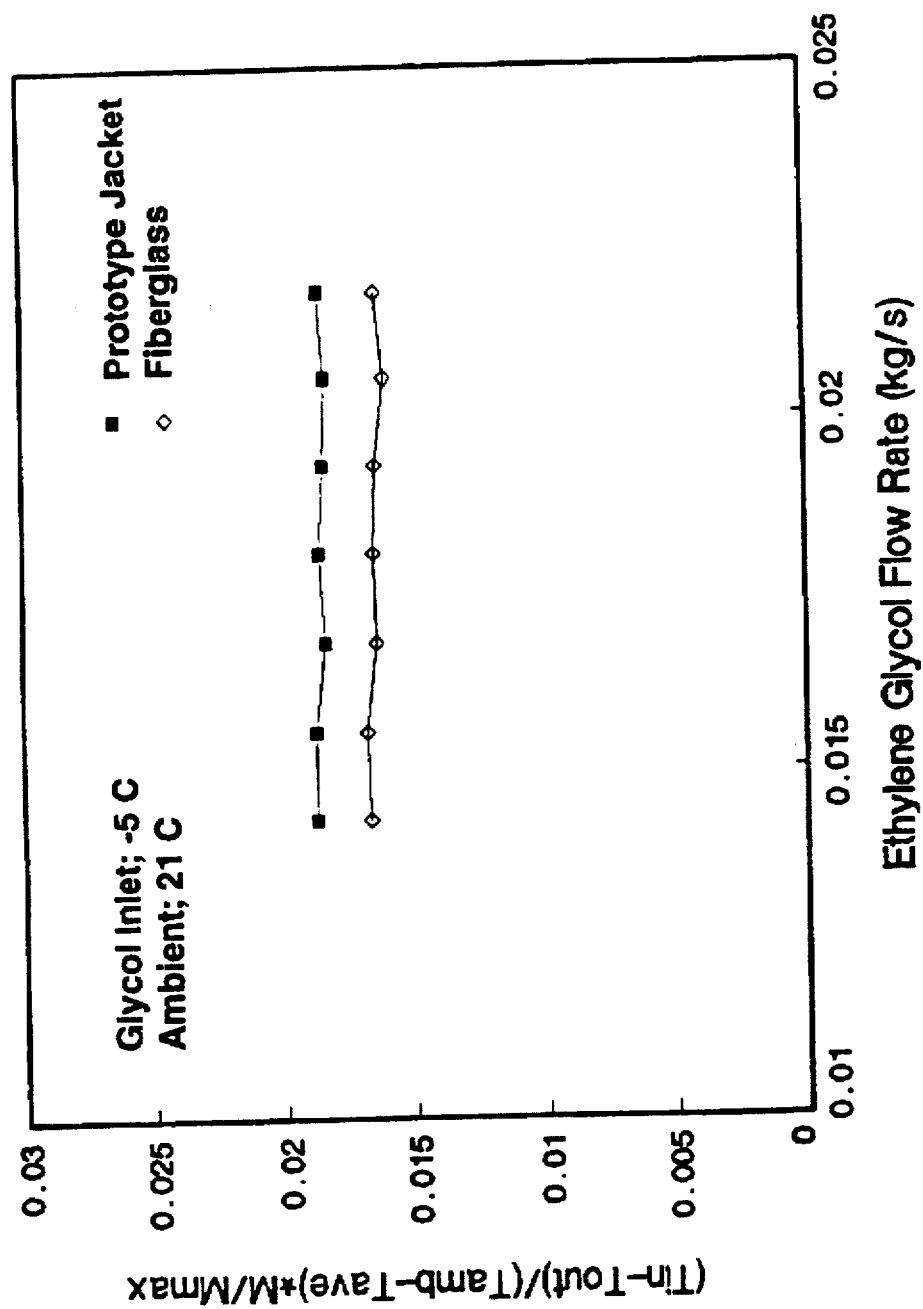
FIG. 19 is a graph dimensionless temperature difference versus flow rates for a test.

A representative test of the valve jackets is summarized in FIG. 19. The test was run at a nominal glycol temperature of −5° C. The reference leg was insulated with fiberglass and the trace for the reference leg deviates from that shown in FIG. 18 only by the uncertainty of the measurement (data scatter). The trace for the insulation jackets shows a value of Θ approximately 23% higher than the fiberglass. This indicates that the insulating capability of the valve jackets approaches that of fiberglass for the conditions of this test.

Due to the heat transfer through the straight sections connecting the valves, the ratio of the measured heat transfer in the two legs must be corrected to yield an accurate comparison of the two insulation systems. A straight section correction was obtained by removing the valve assembly and installing a straight section of tubing of the same diameter and length. The tubing was then insulated over its entire length with the same thickness of foam insulation as was used between the valves. The measured heat transfer, at each temperature, was then scaled with the length of the straight sections to obtain the correction. Since the straight sections on both valve legs were essentially identical, the same correction was applied to both sides. This correction is included in the following heat transfer results.

Figure 20:
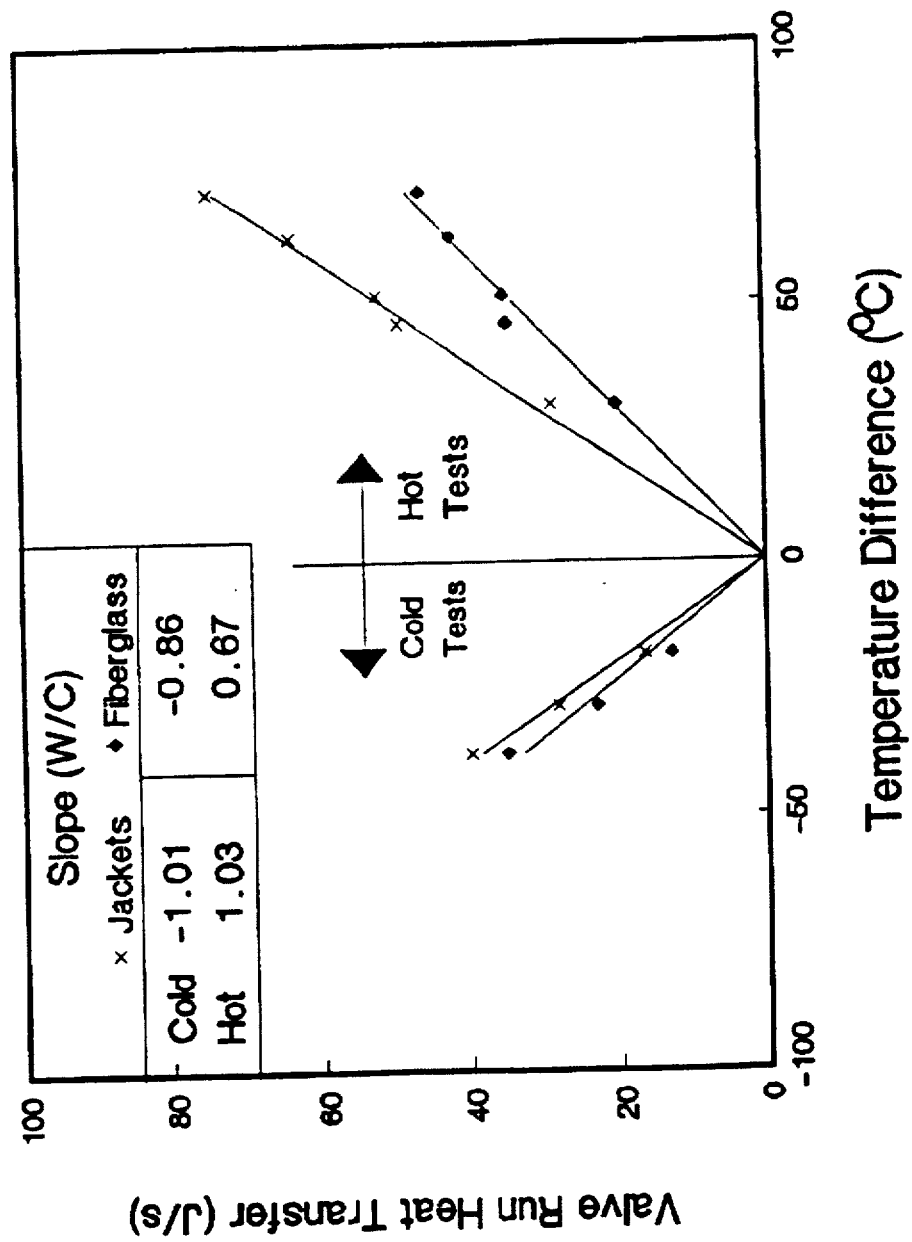
FIG. 20 is a graph of heat transfer rate versus temperature difference between insulated surface and ambient (surroundings).

Tests of the valve jackets were run at eight different temperature levels as shown in FIG. 20. The total heat transfer through the eight valves is plotted versus the temperature difference between the ambient and the average fluid temperature. For all tests the fiberglass insulated valves allowed less heat transfer than the air-gap jacket insulated valves. The differences are summarized in Table 1 where the difference is expressed as a percentage of the heat transfer through the fiberglass insulated valves.

At low temperatures (sub-ambient), the differences are relatively small while at high temperatures, they are somewhat larger. This indicates that the heat transfer results are not symmetrical. An explanation for this phenomenon can be obtained by examining FIG. 20, where linear curve fits to the data are also plotted. The lines were forced to include the point of zero heat transfer at zero temperature difference. The slope of each of the lines is also included on the plot. For the air-gap jackets, the magnitude of the slopes are nearly identical for both the hot and cold tests. However, for the fiberglass insulated valves, there is no symmetry.

The fiberglass insulated valves exhibit more heat transfer at a given temperature difference for the low temperature tests. This is apparently due to condensation on the exposed valve handle. Since the condensation process is very effective in transferring heat, the temperature of the valve handle would be expected to approach the dew point temperature of the air. A large temperature gradient along the valve stem causes increased conduction heat transfer into the system. Condensation on the exposed valve handles was observed for all the low temperature tests on the fiberglass insulated valves.

Figure 21:
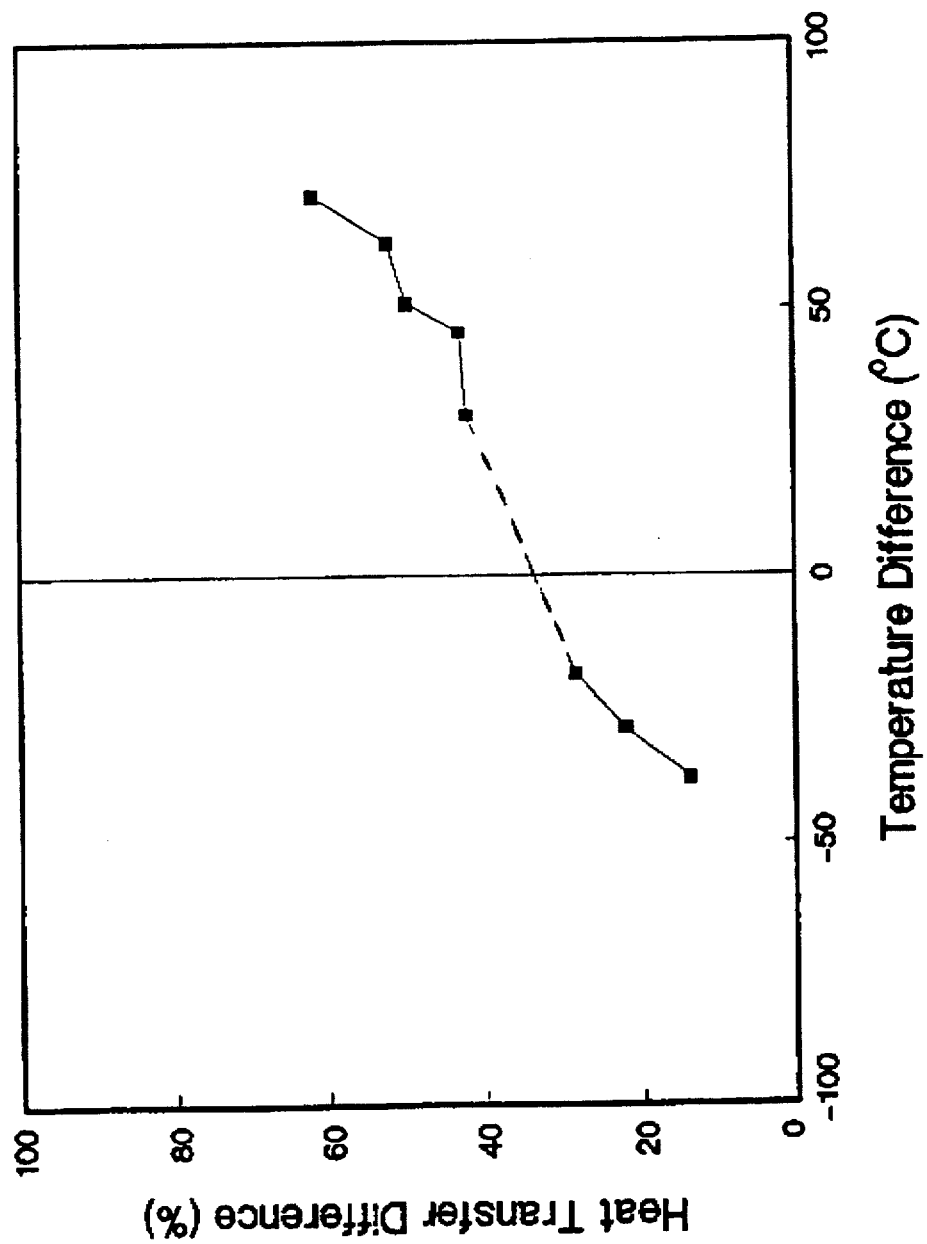
FIG. 21 is a graph of heat transfer difference (%) versus temperature difference between insulated surface and ambient (surroundings).

The fact that the air-gap jackets exhibit a symmetrical heat transfer characteristic indicates that condensation was not a factor in the heat transfer for the jackets. The data from Table 1 is plotted in FIG. 21 for reference. The dotted part of the curve straddles the ambient temperature in an area where no data were obtained.

TABLE 1

Summary of Valve Jacket Heat Transfer Tests

| Tave - Tamb (°C.) | Qj (W) | Qf (W) | (Qj-Qf)/Qf |
|---|---|---|---|
| −37.8 | 39.6 | 34.8 | 13.9 |
| −28.5 | 27.9 | 22.8 | 22.2 |
| −18.3 | 16.5 | 12.9 | 28.3 |
| 30.4 | 28.3 | 19.9 | 42.1 |
| 45.8 | 49.0 | 34.3 | 42.9 |
| 51.2 | 52.0 | 34.7 | 49.9 |
| 62.6 | 63.5 | 41.7 | 52.3 |
| 71.4 | 74.3 | 45.9 | 61.7 |

TABLE 2

Straight Pipe Heat Transfer Test Results

| Insulation Type | Measured Heat Transfer (W) | Calculated Heat Transfer (W) |
|---|---|---|
| Bare Pipe | 126.7 | 131.0 |
| ½" Polyurethane Foam | 59.7 | 48.0 |
| Air Gap - 1 shell | 68.6 | 77.7 |
| Air Gap - 2 shells | 54.4 | 54.8 |
| Air Gap - 3 shells | 44.6 | 44.4 |

Another series of tests were run with straight pipe sections, with various insulations, in place of the valve runs. The configurations tested include bare pipe, 1.27 cm thick polyurethane foam, and several air-gap configurations. The air-gap designs tested involved concentric shells, trapping annular air-gaps, installed around the straight section. Tests were run with a single concentric shell and with two and three shells. An air-gap of 7 mm was used between each shell and between the pipe and the first shell. The shells were made of 1 mm thick polycarbonate and were held away from the pipe surface by polyurethane foam spacers at the midpoint and at both ends of the 2.3 m test section.

Figure 22:
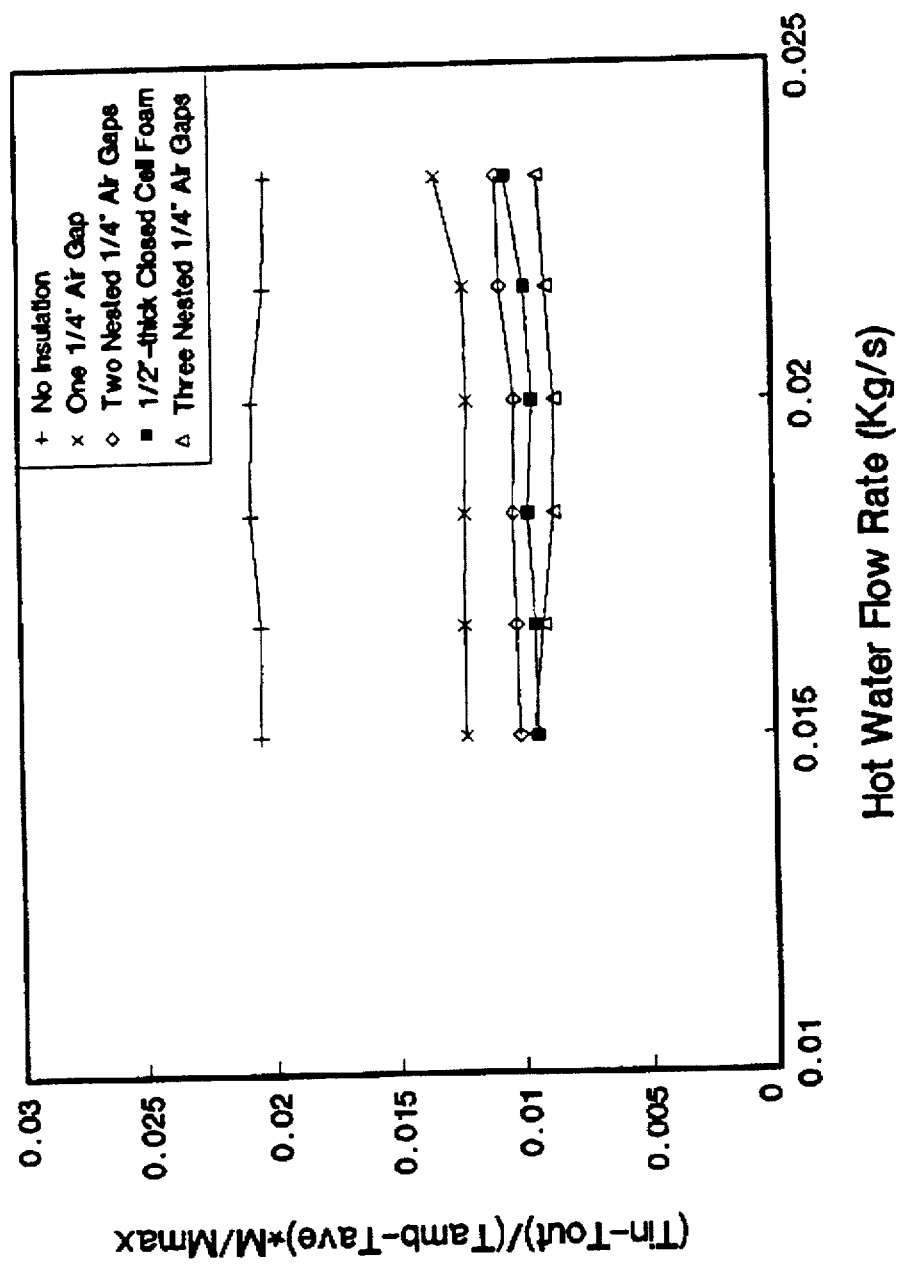
FIG. 22 is a graph showing a comparison of insulation effectiveness of single and multiple air gaps with foam.
Figure 23:
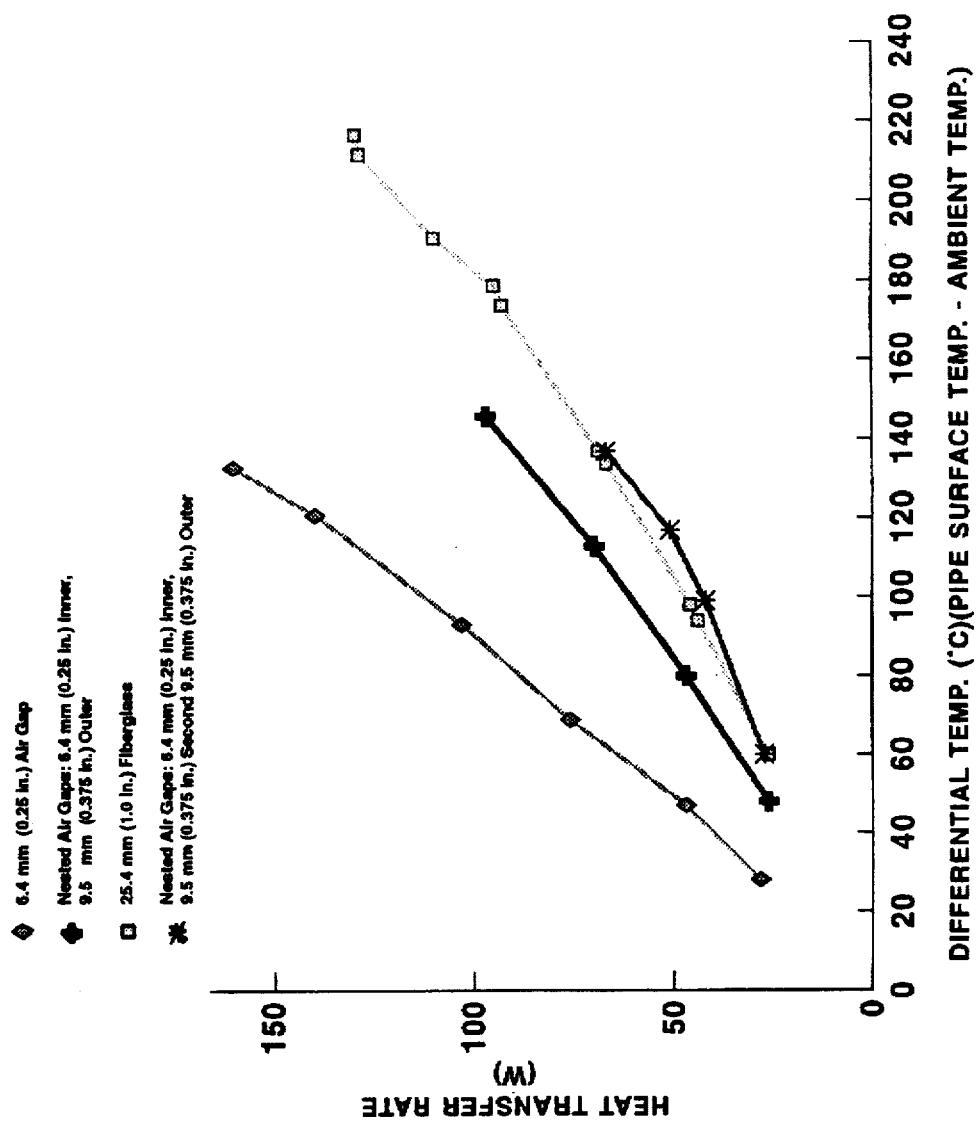
FIG. 23 is a graph showing a comparison of heat transfer rate of one, two and three shell air gaps with fiberglass.
Figure 24:
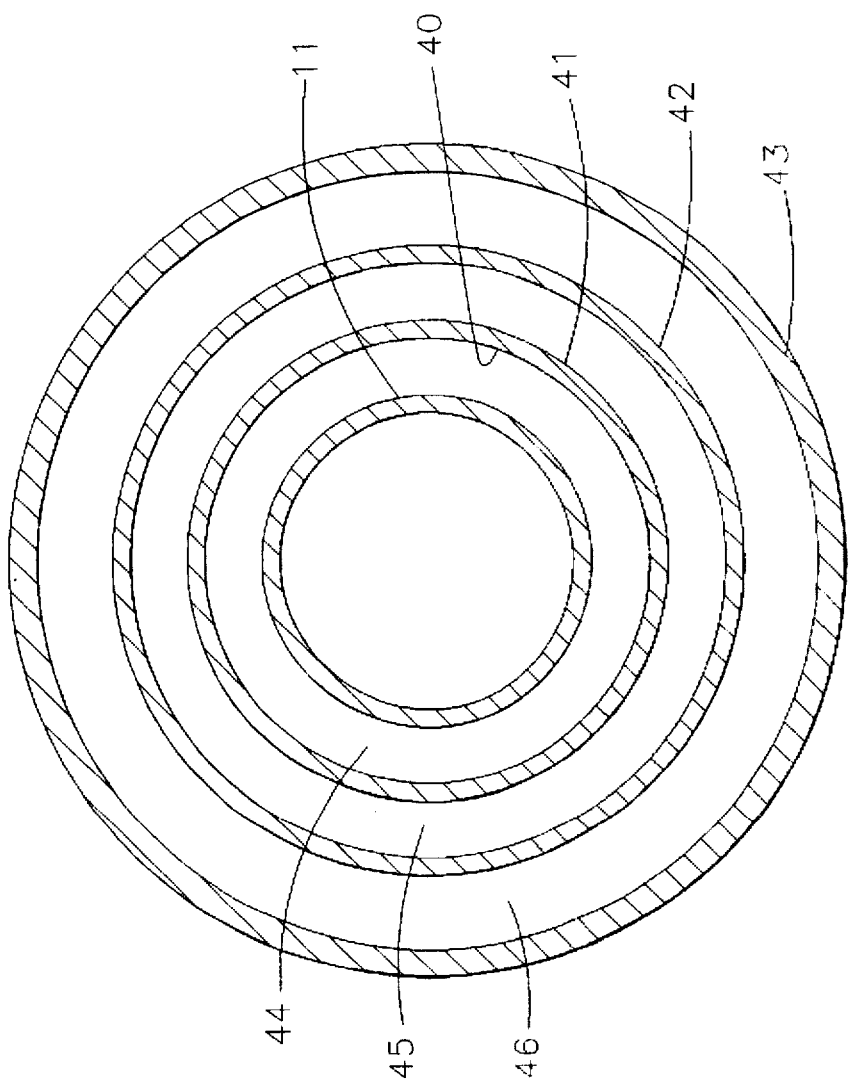
FIG. 24 is a vertical section substantially along the line 10—10 of FIG. 6 in the direction of the arrows thereon showing an alternate embodiment with the latching system not shown.

All of the straight pipe tests were run with essentially the same water temperature (93° C.). The experimental data are given in FIG. 22. These results are summarized in Table 2 as heat transfer rates. As can be seen from the table, the foam insulation restricts about half (53%) of the heat transfer experienced by the bare pipe. The air-gap configurations straddle the result for the form with the three shell case restricting approximately 65% of the bare pipe heat transfer. It should be noted that the two shell configuration has essentially the same outer diameter as the foam with slightly inferior insulating performance.

In an effort to better understand the experimental results, a heat transfer model of the straight pipe geometry was formulated. The heat transfer problem is complicated because both radiation and convection make significant contributions. This is particularly true in the case of the bare pipe where the exposed surface is approximately 70° C. above the surroundings. For the other cases, where the exposed surface temperature is closer to the ambient, the radiation from the outer surface is still significant. For the air-gap configurations radiation through the gap also contributes to the overall heat transfer conductance.

Initially, heat transfer calculations were made assuming radiation effects were not present. For the bare pipe, this involved an evaluation of the film coefficient on the inside of the pipe from standard correlations (Incropera and Dewitt, 1985) The thermal resistance of the pipe wall (actually copper tube with 1.27 mm wall) was found to be negligible. Natural convection on the exterior cylindrical surface was assumed and the heat transfer characteristics were taken from a standard correlation (Incropera and Dewitt, 1985). A similar calculation for the foam insulation case was made by adding an annular conduction resistance to the bare pipe calculation.

The calculations for the air-gap configurations include a heat transfer resistance associated with the air in the annular air gaps. A well-known correlation (Incropera and Dewitt, 1985) was used to evaluate this term. The correlation evaluates the increase in the effective thermal conductivity, compared to the value for still air, due to natural convection in the annulus. Due to the dimensions of the gap and the temperature driving force present in our tests, it was found that the air-gap can be modeled as still air. Thus, each air-gap is modeled as a conductive resistance with the thermal conductivity of still air. It is interesting to note that, the resistance of the innermost air-gap is greater than the second. And, the second gap resistance is greater than the third. This effect of diminishing returns per unit thickness of insulation is also observed in conventional insulation systems.

In addition to the convective and conductive heat transfer paths, radiation also plays a role. A significant uncertainty in performing the radiation calculations is the surface properties. The emissivity is, in general, dependent on wavelength, temperature and surface condition. However, it was decided to include radiation equations in the model with constant emissivity values to obtain as much realism as possible. An emissivity of 0.3 was used for the copper pipe surface while a value of 0.5 was used for all other surfaces. These choices were guided by the tabulations found in (Siegel and Howell, 1972).

Due to the fact that the radiation heat transfer depends strongly on the temperature, the solution procedure for the combined mode heat transfer involves an iteration on the shell temperatures. Initially, these temperatures are specified arbitrarily and the various resistances are calculated. A heat transfer analysis then leads to updated shell temperatures and the iteration proceeds until these temperatures converge. Due to the nature of the problem, the iteration is relatively stable and converges rapidly to a solution. Once a converged solution has been obtained the total heat transfer can be calculated. The results of these calculations are summarized as heat transfer rates in Table 2.

From Table 2, a comparison indicates that the calculated heat transfer rates are close to the measured values in each case. An examination of the calculations confirm the trends observed in the measured data. For the air gap configurations, the addition of each successive shell reduces the heat transfer rate but the incremental reduction is less for each shell. This implies that a strong economic optimum must exist where the cost of an additional shell is not justified by heat transfer savings. This optimum will be different for each application depending on the relative cost of adding the shells and the value of the heat transfer reductions.

What is claimed is:

1. A method of heat insulating an element of a hot or cold fluid distribution system comprising the following steps,
    providing an insulation system formed by a thin plastic jacket material around the element,
    choosing the jacket material thickness such that the insulation value of the jacket material is insignificant relative to the overall insulation value of the insulation system,
    forming an air space around the element by the use of the plastic jacket and means within the jacket for abutting the element to allow for the formation and the maintenance of the air space between the jacket and the element, the air space forming substantially all of the insulation value of the insulation system,
    omitting other kinds of solid insulation from the air space,
    providing a translucent portion in the jacket so that one of the element, the interior portions of the jacket or the interior wall of the jacket can be inspected without removing the jacket, and
    providing at least one joint along the length of the jacket for ease of installation, the jacket carrying a seal that allows an installer to install the jacket by closing the joint to thereby effect sealing of the joint.

2. The method of claim 1 including the step of,
    providing the translucent portion by forming a portion of the jacket from translucent plastic.

3. The method of claim 1 including the steps of,
    providing the jacket around a valve in a chilled fluid distribution system and
    providing a removable cover on the jacket for access to a handle of the valve.

4. The method of claim 3 including the step of,
    forming the cover from a stretchable material which allows installation by stretching over a portion of the jacket.

5. The method of claim 3 including the step of,
    forming the cover of a translucent material.

6. The method of claim 5 including step of,
    forming the translucent material of the cover of a transparent material.

7. The method of claim 1 including the steps of,
    installing the jacket by using a fastening mechanism which is part of the jacket.

8. The method of claim 7 including the step of,
    forming the fastening mechanism of the plastic forming the jacket and
    forming the fastening mechanism during the fabrication of the jacket.

9. The method of claim 1 including the steps of,
    making the jacket of plural portions that are identical and
    forming a fastening mechanism in the portions during the fabrication of the jacket portions.

10. The method of claim 1 including the step of,
    forming plural air spaces within the air space between the jacket and the element by providing additional layers of thin jacket material to increase the insulation value of the insulation system.

11. The method of claim 1 including the step of,
    making the translucent portion in the jacket transparent.

12. A method of heat insulating an element of a chilled fluid distribution system comprising the following steps, providing an insulation system formed by a thin plastic jacket material around the element, choosing the jacket material thickness such that the insulation value of the jacket material is insignificant relative to the overall insulation value of the insulation system, forming an air space around the element by the use of the thin plastic jacket and means within the jacket for abutting the element to allow for the formation and the maintenance of the air space between the jacket and the element, the air space forming substantially all of the insulation value of the insulation system, omitting other kinds of solid insulation from the air space, providing a translucent portion in the jacket so that one of the element, the interior portions of the jacket or the interior wall of the jacket can be inspected without removing the jacket, and providing at least one joint along the length of the jacket for ease of installation, the jacket carrying a seal that allows an installer to install the jacket by closing the joint to thereby effect sealing of the joint.

13. The method of claim 12 including the step of, providing the translucent portion by forming a portion of the jacket from translucent plastic.

14. The method of claim 12 including the steps of, providing the jacket around a valve in a chilled fluid distribution system and providing a removable cover on the jacket for access to a handle of the valve.

15. The method of claim 14 including the step of, forming the cover from a stretchable material which allows installation by stretching over a portion of the jacket.

16. The method of claim 14 including the step of, forming the cover of a translucent material.

17. The method of claim 12 including the steps of, installing the jacket by using a fastening mechanism which is part of the jacket.

18. The method of claim 17 including the step of, forming the fastening mechanism of the plastic forming the jacket and forming the fastening mechanism during the fabrication of the jacket.

19. The method of claim 12 including the step of, making the jacket of plural portions that are identical and forming a fastening mechanism in the portions during the fabrication of the jacket portions.

20. The method of claim 12 including the step of, forming plural air spaces within the air space between the jacket and the element by providing additional layers of thin jacket material to increase the insulation value of the insulation system.

21. The method of claim 12 including the step of, sealing the jacket from an outer environment.

22. The method of claim 1 including the step of, sealing the jacket from an outer environment.

23. The method of claim 12 including the step of, making the translucent portion in the jacket transparent.

* * * * *